US010179479B2

(12) United States Patent
Boley et al.

(10) Patent No.: US 10,179,479 B2
(45) Date of Patent: Jan. 15, 2019

(54) PLANT OIL-CONTAINING RUBBER COMPOSITIONS, TREAD THEREOF AND RACE TIRES CONTAINING THE TREAD

(71) Applicant: Bridgestone Americas Tire Operations, LLC, Nashville, TN (US)

(72) Inventors: Dennis C. Boley, Akron, OH (US); Brett W. Schilling, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 11 days.

(21) Appl. No.: 15/153,389

(22) Filed: May 12, 2016

(65) Prior Publication Data

US 2016/0339744 A1 Nov. 24, 2016

Related U.S. Application Data

(60) Provisional application No. 62/163,553, filed on May 19, 2015.

(51) Int. Cl.
| | | |
|---|---|---|
| *B60C 1/00* | (2006.01) | |
| *C08L 9/06* | (2006.01) | |
| *B60C 11/00* | (2006.01) | |

(52) U.S. Cl.
CPC .............. *B60C 1/0016* (2013.01); *C08L 9/06* (2013.01); *B60C 2011/0025* (2013.01)

(58) Field of Classification Search
CPC .. B60C 1/0016; B60C 2011/0025; C08L 9/06
USPC ....................................................... 524/300
See application file for complete search history.

(56) References Cited

U.S. PATENT DOCUMENTS

| | | |
|---|---|---|
| 5,204,407 A | 4/1993 | Araki et al. |
| 5,252,649 A | 10/1993 | Hausmann |
| 5,363,895 A * | 11/1994 | Wells ................. B60C 11/0309 152/209.2 |
| 5,462,979 A | 10/1995 | Sandstrom |
| 5,504,164 A | 4/1996 | O'Donnell |
| 5,512,638 A | 4/1996 | O'Donnell |
| 5,551,638 A | 9/1996 | Caley |
| 5,580,513 A | 12/1996 | Patitsas et al. |
| 5,583,173 A | 12/1996 | Gujarathi et al. |
| 5,618,852 A | 4/1997 | Adkins |
| 5,624,990 A | 4/1997 | Vipperman |
| 5,650,454 A | 7/1997 | Hoover et al. |
| 5,679,729 A | 10/1997 | Wideman et al. |
| 5,717,022 A | 2/1998 | Beckmann et al. |
| 5,736,611 A | 4/1998 | Blok |
| 5,760,114 A | 6/1998 | Wideman et al. |
| 5,777,013 A | 7/1998 | Gardiner et al. |
| 5,780,535 A | 7/1998 | Ohashi et al. |
| 5,792,800 A | 8/1998 | Wideman et al. |
| 5,824,397 A | 10/1998 | Koops et al. |
| 5,840,795 A | 11/1998 | Freeman et al. |
| 5,840,801 A | 11/1998 | Gardiner |
| 5,859,169 A | 1/1999 | Burkhart et al. |
| 5,871,846 A | 2/1999 | Freeman et al. |
| 5,877,244 A | 3/1999 | Hoover et al. |
| 5,885,524 A | 3/1999 | Watanabe et al. |
| 5,896,904 A | 4/1999 | Ozaki et al. |
| 5,908,893 A | 6/1999 | Kawasaki et al. |
| 5,914,372 A | 6/1999 | Hasegawa et al. |
| 5,929,156 A | 7/1999 | Fultz et al. |
| 5,955,553 A | 9/1999 | Oziomek et al. |
| 5,959,062 A | 9/1999 | Ohtsuka et al. |
| 6,013,340 A | 1/2000 | Bonk et al. |
| 6,025,415 A | 2/2000 | Scholl |
| 6,046,260 A | 4/2000 | Hoover |
| 6,057,392 A | 5/2000 | Wideman et al. |
| 6,063,837 A | 5/2000 | Kawamura et al. |
| 6,077,606 A | 6/2000 | Gillick et al. |
| 6,079,468 A | 6/2000 | D'Sidocky et al. |
| 6,080,805 A | 6/2000 | Kaufman |
| 6,103,792 A | 8/2000 | Hoover et al. |
| 6,116,313 A | 9/2000 | Costa Pereira et al. |
| 6,120,911 A | 9/2000 | Beers et al. |
| 6,129,877 A | 10/2000 | Kuc, Sr. |
| 6,136,897 A | 10/2000 | Kaufman |

(Continued)

FOREIGN PATENT DOCUMENTS

| | | |
|---|---|---|
| BR | PI1103251 A2 | 7/2013 |
| CN | 1408752 A | 4/2003 |

(Continued)

OTHER PUBLICATIONS

English Abstract of CN101481469B, dated Jul. 23, 2013.
English Abstract of CN101628997B, dated Apr. 10, 2013.
English Abstract of CN101831320B, dated Jun. 12, 2013.
English Abstract of CN102174218B, dated Jan. 2, 2013.
English Abstract of CN102181160B, dated Jan. 2, 2013.
English Abstract of CN102453294A, dated May 16, 2012.
English Abstract of CN102492194B, dated Oct. 16, 2013.
English Abstract of CN102604170A, dated Jul. 25, 2012.
English Abstract of CN102850714A, dated Jan. 2, 2013.
English Abstract of CN102863650B, dated Jan. 29, 2014.

(Continued)

*Primary Examiner* — Angela C Scott
(74) *Attorney, Agent, or Firm* — Meredith E. Hooker; Jenny L. Sheaffer

(57) ABSTRACT

Disclosed herein are rubber compositions comprising at least one elastomer; reinforcing filler comprising carbon black, silica, or a combination thereof; at least one hydrocarbon resin; and at least one plant oil and optionally at least one additional oil, wherein the total amount of reinforcing filler is at least 25% by weight of the rubber composition and the total amount of oil is at least 60 phr and comprises about 15 to about 35% by weight of the rubber composition. The rubber compositions are useful in tire treads, particularly tire treads for race tires. In certain embodiments the at least one plant oil comprises coconut oil.

20 Claims, No Drawings

(56) References Cited

U.S. PATENT DOCUMENTS

| | | |
|---|---|---|
| 6,147,147 A | 11/2000 | Hoover et al. |
| 6,156,143 A | 12/2000 | Maly et al. |
| 6,177,495 B1 | 1/2001 | Cohen |
| 6,187,843 B1 | 2/2001 | Nohara et al. |
| 6,221,953 B1 | 4/2001 | Sandstrom et al. |
| 6,228,908 B1 | 5/2001 | Takeichi et al. |
| 6,231,026 B1 | 5/2001 | Patitsas et al. |
| 6,277,901 B1 | 8/2001 | Hensel |
| 6,277,902 B1 | 8/2001 | Scholl |
| 6,279,632 B1 | 8/2001 | Hogan et al. |
| 6,313,210 B1 | 11/2001 | Lin et al. |
| 6,322,721 B1 | 11/2001 | Yankner et al. |
| 6,333,375 B1 | 12/2001 | Nakamura et al. |
| 6,344,537 B1 | 2/2002 | Chino et al. |
| 6,380,291 B1 | 4/2002 | von Hellens |
| 6,399,692 B2 | 6/2002 | Hogan et al. |
| 6,410,653 B1 | 6/2002 | Fujii et al. |
| 6,426,142 B1 | 7/2002 | Klein |
| 6,427,741 B1 | 8/2002 | Lukich et al. |
| 6,433,065 B1 | 8/2002 | Lin et al. |
| 6,444,759 B2 | 9/2002 | Datta et al. |
| 6,448,318 B1 | 9/2002 | Sandstrom |
| 6,455,624 B1 | 9/2002 | Serre |
| 6,482,884 B1 | 11/2002 | Schaal et al. |
| 6,492,436 B2 | 12/2002 | Howe et al. |
| 6,512,035 B1 | 1/2003 | Hergenrother et al. |
| 6,512,036 B2 | 1/2003 | Wideman et al. |
| 6,525,121 B1 | 2/2003 | Nohara et al. |
| 6,590,017 B1 | 7/2003 | Hergenrother et al. |
| 6,608,145 B1 | 8/2003 | Lin et al. |
| 6,617,384 B2 | 9/2003 | Wakabayashi et al. |
| 6,675,851 B1 | 1/2004 | Masson et al. |
| 6,759,456 B2 | 7/2004 | Kikuchi |
| 6,767,945 B2 | 7/2004 | Hahn et al. |
| 6,774,185 B2 | 8/2004 | Lin et al. |
| 6,799,815 B2 | 10/2004 | Krishnan et al. |
| 6,800,126 B2 | 10/2004 | Magnus et al. |
| 6,800,684 B2 | 10/2004 | Hayashi et al. |
| 6,822,043 B2 | 11/2004 | Sohnen et al. |
| 6,824,485 B2 | 11/2004 | Edwards et al. |
| 6,831,119 B2 | 12/2004 | Brown et al. |
| 6,846,444 B2 | 1/2005 | Beers et al. |
| 6,903,155 B2 | 6/2005 | Hodge |
| 6,972,307 B2 | 12/2005 | Zimmer et al. |
| 6,998,088 B2 | 2/2006 | Beers et al. |
| 7,007,732 B2 | 3/2006 | Bailey |
| 7,040,367 B2 | 5/2006 | Kollin |
| 7,041,719 B2 | 5/2006 | Kriesel et al. |
| 7,084,228 B2 | 8/2006 | Labauze et al. |
| 7,096,903 B2 | 8/2006 | Weydert et al. |
| 7,112,632 B2 | 9/2006 | Viola et al. |
| 7,119,147 B2 | 10/2006 | Kikuchi |
| 7,119,150 B2 | 10/2006 | Lin et al. |
| 7,166,665 B2 | 1/2007 | Galimberti et al. |
| 7,179,379 B2 | 2/2007 | Appel et al. |
| 7,193,004 B2 | 3/2007 | Weydert et al. |
| 7,196,129 B2 | 3/2007 | Migliarini et al. |
| 7,207,366 B2 | 4/2007 | Sandstrom et al. |
| 7,211,611 B2 | 5/2007 | Wilson, III |
| 7,231,951 B2 | 6/2007 | Sandstrom et al. |
| 7,234,498 B2 | 6/2007 | Agostini |
| 7,240,710 B2 | 7/2007 | Hrycyk et al. |
| 7,247,663 B2 | 7/2007 | Kikuchi et al. |
| 7,253,225 B2 | 8/2007 | Labauze et al. |
| 7,259,199 B2 | 8/2007 | Sandstrom |
| 7,271,208 B2 | 9/2007 | Chenchy et al. |
| 7,275,572 B2 | 10/2007 | Kikuchi et al. |
| 7,285,584 B2 | 10/2007 | Hsu et al. |
| 7,294,664 B2 | 11/2007 | Jones et al. |
| 7,300,970 B2 | 11/2007 | Durel et al. |
| 7,322,393 B2 | 1/2008 | Serra et al. |
| 7,335,692 B2 | 2/2008 | Vasseur et al. |
| 7,371,791 B2 | 5/2008 | Hattori et al. |
| 7,407,999 B2 | 8/2008 | Tsou et al. |
| 7,411,018 B2 | 8/2008 | Appel et al. |
| 7,423,089 B2 | 9/2008 | Zhao et al. |
| 7,425,602 B2 | 9/2008 | Howard et al. |
| 7,431,061 B2 | 10/2008 | Mathieu et al. |
| 7,432,318 B2 | 10/2008 | Kikuchi |
| 7,473,724 B2 | 1/2009 | Hsu et al. |
| 7,482,401 B2 | 1/2009 | Sugiyama et al. |
| 7,484,544 B2 | 2/2009 | Serra et al. |
| 7,491,767 B2 | 2/2009 | Durel et al. |
| 7,638,574 B2 | 12/2009 | Zhang et al. |
| 7,658,901 B2 | 2/2010 | Prud'Homme et al. |
| 7,659,355 B2 | 2/2010 | Waddell et al. |
| 7,666,933 B2 | 2/2010 | Wu |
| 7,678,855 B2 | 3/2010 | Ohshima |
| 7,683,115 B2 | 3/2010 | Hsu et al. |
| 7,687,558 B2 | 3/2010 | Cruse et al. |
| 7,696,269 B2 | 4/2010 | Cruse et al. |
| 7,709,560 B2 | 5/2010 | Yagi et al. |
| 7,714,041 B2 | 5/2010 | Schmitz et al. |
| 7,714,051 B2 | 5/2010 | Hahn |
| 7,737,202 B2 | 6/2010 | Cruse et al. |
| 7,770,621 B2 | 8/2010 | Tracey et al. |
| 7,772,308 B2 | 8/2010 | Tracey et al. |
| 7,781,533 B2 | 8/2010 | Ozawa et al. |
| 7,834,074 B2 | 11/2010 | Brunelet et al. |
| 7,855,243 B2 | 12/2010 | Kanz et al. |
| 7,882,874 B2 | 2/2011 | Robert et al. |
| 7,897,661 B2 | 3/2011 | Wang et al. |
| 7,906,602 B2 | 3/2011 | Schmitz et al. |
| 7,928,157 B2 | 4/2011 | Sandstrom et al. |
| 7,934,528 B2 | 5/2011 | Amaddeo et al. |
| 7,946,323 B2 | 5/2011 | Kikuchi et al. |
| 7,954,528 B2 | 6/2011 | Tsou et al. |
| 7,960,460 B2 | 6/2011 | Cruse et al. |
| 7,964,656 B2 | 6/2011 | Bohm et al. |
| 7,968,633 B2 | 6/2011 | York et al. |
| 7,968,634 B2 | 6/2011 | York et al. |
| 7,968,635 B2 | 6/2011 | York et al. |
| 7,968,636 B2 | 6/2011 | York et al. |
| 7,987,881 B2 | 8/2011 | Chassagnon et al. |
| 8,013,046 B2 | 9/2011 | Phillips, Jr. et al. |
| 8,022,121 B2 | 9/2011 | Hattori et al. |
| 8,044,118 B2 | 10/2011 | Sakaki et al. |
| 8,044,131 B2 | 10/2011 | Hirayama et al. |
| 8,044,133 B2 | 10/2011 | Hirayama et al. |
| 8,076,404 B2 | 12/2011 | Woolard et al. |
| 8,100,157 B2 | 1/2012 | Hattori et al. |
| 8,101,679 B2 | 1/2012 | Knobloch et al. |
| 8,110,619 B2 | 2/2012 | Zhao et al. |
| 8,119,728 B2 | 2/2012 | Obrecht |
| 8,143,344 B2 | 3/2012 | Koster et al. |
| 8,168,281 B2 | 5/2012 | Laubry |
| 8,168,709 B2 | 5/2012 | Schweitzer et al. |
| 8,178,605 B2 | 5/2012 | Lopitaux et al. |
| 8,182,626 B2 | 5/2012 | Recker et al. |
| 8,227,538 B2 | 7/2012 | York et al. |
| 8,236,875 B2 | 8/2012 | Recker et al. |
| 8,242,194 B2 | 8/2012 | Sandstrom |
| 8,245,743 B2 | 8/2012 | Hahn et al. |
| 8,258,224 B2 | 9/2012 | Minagawa |
| 8,261,796 B2 | 9/2012 | Mruk et al. |
| 8,299,165 B2 | 10/2012 | Mruk et al. |
| 8,304,471 B2 | 11/2012 | Joseph et al. |
| 8,309,657 B2 | 11/2012 | Matsushita et al. |
| 8,324,310 B2 | 12/2012 | Robert et al. |
| 8,329,297 B2 | 12/2012 | Hergenrother et al. |
| 8,349,956 B2 | 1/2013 | Lopitaux et al. |
| 8,362,110 B2 | 1/2013 | Schunack et al. |
| 8,388,784 B2 | 3/2013 | D'Sidocky et al. |
| 8,399,551 B2 | 3/2013 | Gong et al. |
| 8,426,508 B2 | 4/2013 | Hattori et al. |
| 8,476,342 B2 | 7/2013 | Colvin et al. |
| 8,481,447 B2 | 7/2013 | Bosch |
| 8,487,014 B1 | 7/2013 | Flanigan et al. |
| 8,490,666 B2 | 7/2013 | Margot et al. |
| 8,499,805 B2 | 8/2013 | Maesaka et al. |
| 8,546,506 B2 | 10/2013 | McAuliffe et al. |
| 8,555,689 B2 | 10/2013 | Hollinger et al. |
| 8,563,628 B2 | 10/2013 | Sakaki et al. |
| 8,614,276 B2 | 12/2013 | Voge et al. |

(56) References Cited

U.S. PATENT DOCUMENTS

| | | | |
|---|---|---|---|
| 8,629,205 B2 | 1/2014 | Fessenbecker et al. |
| 8,629,213 B2 | 1/2014 | Hidalgo et al. |
| 8,652,624 B2 | 2/2014 | Subramanian et al. |
| 8,664,312 B2 | 3/2014 | Fujikura et al. |
| 8,669,321 B2 | 3/2014 | Hattori et al. |
| 8,695,662 B2 | 4/2014 | Braun et al. |
| 8,696,845 B2 | 4/2014 | Frantzen |
| 8,697,761 B2 | 4/2014 | Martel et al. |
| 8,697,762 B2 | 4/2014 | Flanigan et al. |
| 8,697,775 B2 | 4/2014 | Hall et al. |
| 8,710,140 B2 | 4/2014 | Pialot et al. |
| 8,729,204 B2 | 5/2014 | Suzuki et al. |
| 8,759,432 B2 | 6/2014 | Hattori et al. |
| 8,957,132 B2 | 2/2015 | Voge et al. |
| 8,969,454 B2 | 3/2015 | Bastioli et al. |
| 2002/0062894 A1 | 5/2002 | Miner et al. |
| 2002/0068784 A1 | 6/2002 | Rauline |
| 2002/0077408 A1 | 6/2002 | Rauline |
| 2002/0103089 A1 | 8/2002 | Fukushima et al. |
| 2002/0165302 A1 | 11/2002 | Lamba et al. |
| 2002/0173577 A1 | 11/2002 | Deevers |
| 2003/0205309 A1 | 11/2003 | Sandstrom |
| 2004/0092644 A1 | 5/2004 | Labauze |
| 2004/0092648 A1 | 5/2004 | Jones et al. |
| 2004/0122157 A1 | 6/2004 | Labauze |
| 2004/0143066 A1 | 7/2004 | Galimberti et al. |
| 2004/0214929 A1 | 10/2004 | Bradley et al. |
| 2005/0085582 A1 | 4/2005 | Galimberti et al. |
| 2005/0087725 A1 | 4/2005 | Kanakkanatt |
| 2005/0145312 A1 | 7/2005 | Herberger, Sr. et al. |
| 2005/0182159 A1 | 8/2005 | Udagawa et al. |
| 2005/0222335 A1 | 10/2005 | Jones et al. |
| 2005/0234165 A1 | 10/2005 | Schaal et al. |
| 2005/0260406 A1 | 11/2005 | Cataldo et al. |
| 2005/0277723 A1 | 12/2005 | Gong et al. |
| 2006/0124218 A1 | 6/2006 | Nahmias Nanni et al. |
| 2006/0125146 A1 | 6/2006 | Sandstrom |
| 2006/0130948 A1 | 6/2006 | Sandstrom et al. |
| 2006/0169382 A1 | 8/2006 | Sandstrom |
| 2006/0169390 A1 | 8/2006 | Galimberti et al. |
| 2006/0231183 A1 | 10/2006 | Serra et al. |
| 2007/0082991 A1 | 4/2007 | Chassagnon et al. |
| 2007/0137753 A1 | 6/2007 | Hirayama et al. |
| 2007/0249775 A1* | 10/2007 | Hogan ............... B60C 1/0016 524/495 |
| 2007/0270538 A1 | 11/2007 | Somers et al. |
| 2007/0276062 A1 | 11/2007 | Tirelli et al. |
| 2008/0058452 A1 | 3/2008 | Jung |
| 2008/0188621 A1* | 8/2008 | Ichino ............... B60C 1/0016 525/232 |
| 2009/0005481 A1 | 1/2009 | Ishida et al. |
| 2009/0008013 A1 | 1/2009 | Nagahara |
| 2009/0020205 A1 | 1/2009 | Cogne et al. |
| 2009/0048400 A1 | 2/2009 | Jung et al. |
| 2009/0107608 A1 | 4/2009 | Sandstrom |
| 2009/0124738 A1 | 5/2009 | Sakurai et al. |
| 2009/0151840 A1 | 6/2009 | Lechtenboehmer et al. |
| 2009/0229720 A1 | 9/2009 | Serra et al. |
| 2009/0298978 A1 | 12/2009 | Rotzinger |
| 2010/0004368 A1 | 1/2010 | Wang |
| 2010/0029852 A1 | 2/2010 | Borkowsky et al. |
| 2010/0041793 A1 | 2/2010 | Pierik et al. |
| 2010/0051153 A1 | 3/2010 | Kojima et al. |
| 2010/0252162 A1 | 10/2010 | Wada et al. |
| 2011/0003912 A1 | 1/2011 | Ebata |
| 2011/0038630 A1 | 2/2011 | Matsuura et al. |
| 2011/0040058 A1 | 2/2011 | McAuliffe et al. |
| 2011/0060062 A1 | 3/2011 | Wang et al. |
| 2011/0071245 A1 | 3/2011 | De-Riva Perez et al. |
| 2011/0146873 A1 | 6/2011 | Weydert et al. |
| 2011/0172339 A1 | 7/2011 | Satou |
| 2011/0213050 A1 | 9/2011 | Pialot et al. |
| 2011/0233479 A1 | 9/2011 | Korzhenko et al. |
| 2011/0253277 A1 | 10/2011 | Mueller et al. |
| 2011/0294936 A1 | 12/2011 | Sato |
| 2011/0319529 A1 | 12/2011 | Helmer et al. |
| 2012/0018066 A1 | 1/2012 | Xie et al. |
| 2012/0059084 A1 | 3/2012 | Brown et al. |
| 2012/0060992 A1 | 3/2012 | Nakagawa et al. |
| 2012/0132346 A1 | 5/2012 | Chen et al. |
| 2012/0157564 A1 | 6/2012 | Kurata |
| 2012/0157568 A1 | 6/2012 | Sandstrom et al. |
| 2012/0225231 A1 | 9/2012 | York |
| 2012/0259043 A1 | 10/2012 | Lopitaux et al. |
| 2012/0270974 A1 | 10/2012 | Steinhauser et al. |
| 2012/0289620 A1 | 11/2012 | Deheunynck et al. |
| 2012/0296041 A1 | 11/2012 | Luo |
| 2012/0302665 A1 | 11/2012 | Wang et al. |
| 2012/0316309 A1 | 12/2012 | Chisholm et al. |
| 2013/0005871 A1 | 1/2013 | Puhala et al. |
| 2013/0061998 A1 | 3/2013 | Sandstrom |
| 2013/0096248 A1 | 4/2013 | Thompson et al. |
| 2013/0102714 A1 | 4/2013 | Recker et al. |
| 2013/0111984 A1 | 5/2013 | Dorfi |
| 2013/0153100 A1 | 6/2013 | Piffard et al. |
| 2013/0153110 A1 | 6/2013 | Miyazaki |
| 2013/0158163 A1 | 6/2013 | Yagi et al. |
| 2013/0158191 A1 | 6/2013 | Colvin et al. |
| 2013/0172474 A1 | 7/2013 | Voge et al. |
| 2013/0184387 A1 | 7/2013 | Tahara et al. |
| 2013/0196085 A1 | 8/2013 | Voge et al. |
| 2013/0202829 A1 | 8/2013 | Voge et al. |
| 2013/0203913 A1 | 8/2013 | Voge et al. |
| 2013/0237637 A1 | 9/2013 | Katou et al. |
| 2013/0253090 A1 | 9/2013 | Katou et al. |
| 2013/0253123 A1 | 9/2013 | Rakhman |
| 2013/0261242 A1 | 10/2013 | Katou et al. |
| 2013/0261356 A1 | 10/2013 | Haas et al. |
| 2013/0267638 A1 | 10/2013 | Katou et al. |
| 2013/0267640 A1 | 10/2013 | Lopez et al. |
| 2013/0274404 A1 | 10/2013 | Vasseur et al. |
| 2013/0274430 A1 | 10/2013 | McCauley et al. |
| 2013/0289182 A1 | 10/2013 | Bastioli et al. |
| 2013/0289183 A1 | 10/2013 | Kerns et al. |
| 2013/0289301 A1 | 10/2013 | Bastioli et al. |
| 2013/0296471 A1 | 11/2013 | Lesage et al. |
| 2013/0299053 A1 | 11/2013 | Fugier et al. |
| 2013/0310483 A1 | 11/2013 | Batti et al. |
| 2013/0331480 A1 | 12/2013 | Suzuki et al. |
| 2013/0331495 A1 | 12/2013 | Ghosal et al. |
| 2013/0345336 A1 | 12/2013 | Lopitaux |
| 2014/0018500 A1 | 1/2014 | Luo |
| 2014/0024745 A1 | 1/2014 | Vasseur et al. |
| 2014/0094538 A1 | 4/2014 | Kim |
| 2014/0102611 A1 | 4/2014 | Miyazaki |
| 2014/0128531 A1 | 5/2014 | Miyazaki et al. |
| 2014/0135424 A1 | 5/2014 | Sandstrom et al. |
| 2014/0135437 A1 | 5/2014 | Sandstrom et al. |
| 2014/0138004 A1 | 5/2014 | Voge et al. |
| 2014/0148540 A1 | 5/2014 | Sandstrom |
| 2014/0155519 A1 | 6/2014 | Ringot |
| 2014/0155543 A1 | 6/2014 | Soddu et al. |
| 2014/0158269 A1 | 6/2014 | Konno et al. |
| 2014/0171557 A1 | 6/2014 | Ringot |
| 2014/0194545 A1 | 7/2014 | Maesaka et al. |
| 2014/0202607 A1 | 7/2014 | Sandstrom |
| 2014/0202608 A1 | 7/2014 | Sandstrom |
| 2014/0224396 A1 | 8/2014 | Shimanaka et al. |
| 2014/0230981 A1 | 8/2014 | Shimanaka et al. |
| 2014/0235751 A1 | 8/2014 | Lesage et al. |
| 2014/0243448 A1 | 8/2014 | Lesage et al. |
| 2014/0251519 A1 | 9/2014 | Piffard et al. |
| 2014/0350138 A1 | 11/2014 | Cladiere et al. |
| 2014/0371346 A1 | 12/2014 | Saintigny et al. |
| 2015/0087745 A1 | 3/2015 | Chekanov et al. |

FOREIGN PATENT DOCUMENTS

| | | |
|---|---|---|
| CN | 102174218 A | 9/2011 |
| CN | 102453294 A | 5/2012 |
| CN | 102604170 A | 7/2012 |
| CN | 102174218 B | 1/2013 |
| CN | 102181160 B | 1/2013 |
| CN | 102850714 A | 1/2013 |

(56) References Cited

FOREIGN PATENT DOCUMENTS

| | | |
|---|---|---|
| CN | 101628997 B | 4/2013 |
| CN | 103044736 A | 4/2013 |
| CN | 101831320 B | 6/2013 |
| CN | 102492194 B | 10/2013 |
| CN | 103333378 A | 10/2013 |
| CN | 103360622 A | 10/2013 |
| CN | 103450504 A | 12/2013 |
| CN | 102863650 B | 1/2014 |
| CN | 103012840 B | 1/2014 |
| CN | 103524793 A | 1/2014 |
| CN | 103554560 A | 2/2014 |
| CN | 103627092 A | 3/2014 |
| CN | 103665285 A | 3/2014 |
| CN | 103665897 A | 3/2014 |
| CN | 103804728 A | 5/2014 |
| CN | 103804729 A | 5/2014 |
| CN | 103819720 A | 5/2014 |
| CN | 101481469 B | 6/2014 |
| CN | 103834076 A | 6/2014 |
| CN | 103849017 A | 6/2014 |
| CN | 103881157 A | 6/2014 |
| CN | 103881163 A | 6/2014 |
| CN | 103911230 A | 7/2014 |
| CN | 103923368 A | 7/2014 |
| CN | 103980581 A | 8/2014 |
| CN | 103992507 A | 8/2014 |
| CN | 103992537 A | 8/2014 |
| CN | 104004223 A | 8/2014 |
| CN | 104004244 A | 8/2014 |
| CN | 104004245 A | 8/2014 |
| CN | 104004246 A | 8/2014 |
| CN | 104004247 A | 8/2014 |
| DE | 19700967 A1 | 7/1998 |
| DE | 19963781 A1 | 7/2000 |
| DE | 102004005132 A1 | 8/2005 |
| DE | 102008007993 A1 | 8/2009 |
| DE | 102008027694 A1 | 12/2009 |
| DE | 102008037593 A1 | 5/2010 |
| EA | 008517 B1 | 6/2007 |
| EP | 0775719 A2 | 5/1997 |
| EP | 0748837 B1 | 11/2000 |
| EP | 1078955 B1 | 2/2001 |
| EP | 1095949 A1 | 5/2001 |
| EP | 1127078 A1 | 8/2001 |
| EP | 0849316 B1 | 10/2001 |
| EP | 1165681 A1 | 1/2002 |
| EP | 0921150 B1 | 4/2003 |
| EP | 0985554 B1 | 11/2003 |
| EP | 0861869 B1 | 4/2004 |
| EP | 1085049 B1 | 5/2004 |
| EP | 0988999 B1 | 6/2004 |
| EP | 1465945 A1 | 10/2004 |
| EP | 1439205 B1 | 4/2005 |
| EP | 1523523 A1 | 4/2005 |
| EP | 1626062 A1 | 2/2006 |
| EP | 1270657 B1 | 3/2006 |
| EP | 1234852 B1 | 6/2006 |
| EP | 1526002 B1 | 9/2007 |
| EP | 2088169 A1 | 8/2009 |
| EP | 2098564 A1 | 9/2009 |
| EP | 2112003 A1 | 10/2009 |
| EP | 2218750 A1 | 8/2010 |
| EP | 2246200 A1 | 11/2010 |
| EP | 2246200 A1 | 11/2010 |
| EP | 2250218 A1 | 11/2010 |
| EP | 2102017 B1 | 12/2010 |
| EP | 2294123 A1 | 3/2011 |
| EP | 2217452 B1 | 4/2011 |
| EP | 2193036 B1 | 9/2011 |
| EP | 2163575 B1 | 10/2011 |
| EP | 2300244 B1 | 12/2011 |
| EP | 2284023 B1 | 3/2012 |
| EP | 2231422 B1 | 7/2012 |
| EP | 2512825 A1 | 10/2012 |
| EP | 2512826 A1 | 10/2012 |
| EP | 2526145 A1 | 11/2012 |
| EP | 2547726 A1 | 1/2013 |
| EP | 2626384 A1 | 8/2013 |
| EP | 2629986 A1 | 8/2013 |
| EP | 2655089 A1 | 10/2013 |
| EP | 2674452 A1 | 12/2013 |
| EP | 2716700 A1 | 4/2014 |
| EP | 2727748 A1 | 5/2014 |
| EP | 2748014 A1 | 7/2014 |
| EP | 2748248 A1 | 7/2014 |
| EP | 2750904 A2 | 7/2014 |
| EP | 2751142 A1 | 7/2014 |
| JP | 8176351 A2 | 7/1996 |
| JP | 8176397 A2 | 7/1996 |
| JP | 9067472 A2 | 3/1997 |
| JP | H-0967472 A | 3/1997 |
| JP | 9208604 A2 | 8/1997 |
| JP | 10279735 A2 | 10/1998 |
| JP | 2000239452 A2 | 9/2000 |
| JP | 2000344948 A2 | 12/2000 |
| JP | 2000351874 A2 | 12/2000 |
| JP | 2001049032 A2 | 2/2001 |
| JP | 2001049045 A2 | 2/2001 |
| JP | 2001098115 A2 | 4/2001 |
| JP | 2001158835 A2 | 6/2001 |
| JP | 2001233997 A2 | 8/2001 |
| JP | 2002037925 A2 | 2/2002 |
| JP | 2002256111 A2 | 9/2002 |
| JP | 2002327093 A2 | 11/2002 |
| JP | 2002338736 A2 | 11/2002 |
| JP | 3379900 B2 | 2/2003 |
| JP | 2003155381 A2 | 5/2003 |
| JP | 2003238744 A2 | 8/2003 |
| JP | 2003246883 A2 | 9/2003 |
| JP | 2003292686 A2 | 10/2003 |
| JP | 2003327747 A2 | 11/2003 |
| JP | 2003327749 A2 | 11/2003 |
| JP | 2004027028 A2 | 1/2004 |
| JP | 2004051754 A2 | 2/2004 |
| JP | 2004204147 A2 | 7/2004 |
| JP | 3594149 B2 | 11/2004 |
| JP | 3602946 B2 | 12/2004 |
| JP | 2005226040 A2 | 8/2005 |
| JP | 2005226041 A2 | 8/2005 |
| JP | 2005232355 A2 | 9/2005 |
| JP | 3732625 B2 | 1/2006 |
| JP | 2006063094 A2 | 3/2006 |
| JP | 3785541 B2 | 6/2006 |
| JP | 2006232880 A2 | 9/2006 |
| JP | 2006241216 A2 | 9/2006 |
| JP | 2006291103 A2 | 10/2006 |
| JP | 3839130 B2 | 11/2006 |
| JP | 3874471 B2 | 1/2007 |
| JP | 2007099874 A2 | 4/2007 |
| JP | 2007099892 A | 4/2007 |
| JP | 2007112847 A2 | 5/2007 |
| JP | 3936052 B2 | 6/2007 |
| JP | 2007197004 A2 | 8/2007 |
| JP | 3979862 B2 | 9/2007 |
| JP | 2007231085 A2 | 9/2007 |
| JP | 2007269259 A2 | 10/2007 |
| JP | 2007284482 A2 | 11/2007 |
| JP | 2007302813 A2 | 11/2007 |
| JP | 4028772 B2 | 12/2007 |
| JP | 4059691 B2 | 3/2008 |
| JP | 4063578 B2 | 3/2008 |
| JP | 4067332 B2 | 3/2008 |
| JP | 2008056802 A | 3/2008 |
| JP | 2008138140 A2 | 6/2008 |
| JP | 2008138140 A2 | 6/2008 |
| JP | 2008144117 A2 | 6/2008 |
| JP | 2008150413 A2 | 7/2008 |
| JP | 2008150426 A2 | 7/2008 |
| JP | 2008150435 A2 | 7/2008 |
| JP | 2008189880 A2 | 8/2008 |
| JP | 2008189880 A2 | 8/2008 |
| JP | 2008201827 A2 | 9/2008 |
| JP | 2008255248 A2 | 10/2008 |
| JP | 2008266381 A2 | 11/2008 |

(56) References Cited

FOREIGN PATENT DOCUMENTS

| | | |
|---|---|---|
| JP | 2008280438 A2 | 11/2008 |
| JP | 4222800 B2 | 2/2009 |
| JP | 2009035603 A2 | 2/2009 |
| JP | 2009040904 A2 | 2/2009 |
| JP | 4255160 B2 | 4/2009 |
| JP | 2009108117 A2 | 5/2009 |
| JP | 2009114257 A | 5/2009 |
| JP | 2009114257 A2 | 5/2009 |
| JP | 2009120739 A2 | 6/2009 |
| JP | 2009242538 A2 | 10/2009 |
| JP | 2009263403 A2 | 11/2009 |
| JP | 2009263536 A2 | 11/2009 |
| JP | 4409971 B2 | 2/2010 |
| JP | 4433264 B2 | 3/2010 |
| JP | 4448067 B2 | 4/2010 |
| JP | 4448225 B2 | 4/2010 |
| JP | 4504654 B2 | 7/2010 |
| JP | 4504654 B2 | 7/2010 |
| JP | 2010209174 A2 | 9/2010 |
| JP | 2010248338 A2 | 11/2010 |
| JP | 2010265431 A2 | 11/2010 |
| JP | 2010285545 A2 | 12/2010 |
| JP | 4607042 B2 | 1/2011 |
| JP | 4607042 B2 | 1/2011 |
| JP | 4621320 B2 | 1/2011 |
| JP | 2011038058 A2 | 2/2011 |
| JP | 2011038058 A2 | 2/2011 |
| JP | 4641214 B2 | 3/2011 |
| JP | 4641214 B2 | 3/2011 |
| JP | 2011052103 A2 | 3/2011 |
| JP | 2011063692 A2 | 3/2011 |
| JP | 2011089081 A2 | 5/2011 |
| JP | 4708209 B2 | 6/2011 |
| JP | 4718681 B2 | 7/2011 |
| JP | 2011148897 A2 | 8/2011 |
| JP | 2011231166 A2 | 11/2011 |
| JP | 4857694 B2 | 1/2012 |
| JP | 4889851 B2 | 3/2012 |
| JP | 2012092263 A2 | 5/2012 |
| JP | 4970755 B2 | 7/2012 |
| JP | 4970755 B2 | 7/2012 |
| JP | 2012131860 A2 | 7/2012 |
| JP | 5002194 B2 | 8/2012 |
| JP | 2012149132 A2 | 8/2012 |
| JP | 2012149133 A2 | 8/2012 |
| JP | 2012149146 A2 | 8/2012 |
| JP | 5019745 B2 | 9/2012 |
| JP | 5043622 B2 | 10/2012 |
| JP | 5062584 B2 | 10/2012 |
| JP | 5079261 B2 | 11/2012 |
| JP | 5089852 B2 | 12/2012 |
| JP | 5089852 B2 | 12/2012 |
| JP | 5132606 B2 | 1/2013 |
| JP | 5148374 B2 | 2/2013 |
| JP | 5179732 B2 | 4/2013 |
| JP | 2013075930 A2 | 4/2013 |
| JP | 2013075931 A2 | 4/2013 |
| JP | 2013075932 A2 | 4/2013 |
| JP | 2013075933 A2 | 4/2013 |
| JP | 2013075934 A2 | 4/2013 |
| JP | 5198774 B2 | 5/2013 |
| JP | 5236254 B2 | 7/2013 |
| JP | 5248211 B2 | 7/2013 |
| JP | 2013159714 A2 | 8/2013 |
| JP | 5282377 B2 | 9/2013 |
| JP | 5295610 B2 | 9/2013 |
| JP | 2013170233 A2 | 9/2013 |
| JP | 2013185012 A2 | 9/2013 |
| JP | 5306576 B2 | 10/2013 |
| JP | 5358880 B2 | 12/2013 |
| JP | 5358881 B2 | 12/2013 |
| JP | 2013256564 A2 | 12/2013 |
| JP | 5394026 B2 | 1/2014 |
| JP | 5394681 B2 | 1/2014 |
| JP | 538952782 | 1/2014 |
| JP | 2014015516 A2 | 1/2014 |
| JP | 2014015535 A2 | 1/2014 |
| JP | 5420300 B2 | 2/2014 |
| JP | 2014024995 A2 | 2/2014 |
| JP | 5436820 B2 | 3/2014 |
| JP | 5442489 B2 | 3/2014 |
| JP | 5474293 B2 | 4/2014 |
| JP | 5474478 B2 | 4/2014 |
| JP | 5475579 B2 | 4/2014 |
| JP | 5480790 B2 | 4/2014 |
| JP | 2014065798 A2 | 4/2014 |
| JP | 2014065799 A2 | 4/2014 |
| JP | 5487809 B2 | 5/2014 |
| JP | 5499728 B2 | 5/2014 |
| JP | 5503245 B2 | 5/2014 |
| JP | 5515867 B2 | 6/2014 |
| JP | 5540534 B2 | 7/2014 |
| JP | 5545102 B2 | 7/2014 |
| JP | 5567454 B2 | 8/2014 |
| JP | 5567454 B2 | 8/2014 |
| KR | 19980070789 A | 10/1998 |
| KR | 100198917 B1 | 6/1999 |
| KR | 100270515 B1 | 3/2001 |
| KR | 100319988 B1 | 1/2002 |
| KR | 100319988 B1 | 1/2002 |
| KR | 20020037595 A | 5/2002 |
| KR | 100347805 B1 | 8/2002 |
| KR | 20020064038 A | 8/2002 |
| KR | 100372746 B1 | 2/2003 |
| KR | 20030030138 A | 4/2003 |
| KR | 100411015 B1 | 12/2003 |
| KR | 20040008442 A | 1/2004 |
| KR | 100481698 B1 | 4/2005 |
| KR | 100502046 B1 | 7/2005 |
| KR | 100505326 B1 | 10/2005 |
| KR | 100553996 B1 | 2/2006 |
| KR | 100592987 B1 | 6/2006 |
| KR | 100593021 B1 | 6/2006 |
| KR | 100606942 B1 | 8/2006 |
| KR | 100635601 B1 | 10/2006 |
| KR | 100635615 B1 | 10/2006 |
| KR | 100635615 B1 | 10/2006 |
| KR | 100650011 B1 | 11/2006 |
| KR | 100655222 B1 | 12/2006 |
| KR | 100656551 B1 | 12/2006 |
| KR | 100656552 B1 | 12/2006 |
| KR | 100668628 B1 | 1/2007 |
| KR | 100668629 B1 | 1/2007 |
| KR | 100692562 B1 | 3/2007 |
| KR | 100698392 B1 | 3/2007 |
| KR | 100714976 B1 | 5/2007 |
| KR | 100738669 B1 | 7/2007 |
| KR | 100738670 B1 | 7/2007 |
| KR | 100738671 B1 | 7/2007 |
| KR | 100738672 B1 | 7/2007 |
| KR | 100738673 B1 | 7/2007 |
| KR | 100738674 B1 | 7/2007 |
| KR | 100746328 B1 | 8/2007 |
| KR | 100746336 B1 | 8/2007 |
| KR | 100750948 B1 | 8/2007 |
| KR | 100781592 B1 | 12/2007 |
| KR | 100797068 B1 | 1/2008 |
| KR | 100846359 B1 | 7/2008 |
| KR | 100885080 B1 | 2/2009 |
| KR | 100885080 B1 | 2/2009 |
| KR | 20090030415 A | 3/2009 |
| KR | 100902345 B1 | 6/2009 |
| KR | 20090116171 A | 11/2009 |
| KR | 20090116171 A | 11/2009 |
| KR | 20100048140 A | 5/2010 |
| KR | 100964308 B1 | 6/2010 |
| KR | 100964308 B1 | 6/2010 |
| KR | 100964310 B1 | 6/2010 |
| KR | 100964310 B1 | 6/2010 |
| KR | 101008605 B1 | 1/2011 |
| KR | 101023759 B1 | 3/2011 |
| KR | 101023759 B1 | 3/2011 |
| KR | 20110072260 A | 6/2011 |
| KR | 20110072260 A | 6/2011 |

(56) References Cited

FOREIGN PATENT DOCUMENTS

| | | |
|---|---|---|
| KR | 101053061 B1 | 8/2011 |
| KR | 20110088125 A | 8/2011 |
| KR | 101122193 B1 | 3/2012 |
| KR | 101122193 B1 | 3/2012 |
| KR | 101132811 B1 | 4/2012 |
| KR | 101132814 B1 | 4/2012 |
| KR | 101132814 B1 | 4/2012 |
| KR | 20120048377 A | 5/2012 |
| KR | 20120057074 A | 6/2012 |
| KR | 20120097592 A | 9/2012 |
| KR | 101278216 B1 | 7/2013 |
| KR | 101278216 B1 | 7/2013 |
| KR | 101313732 B1 | 10/2013 |
| KR | 101314581 B1 | 10/2013 |
| KR | 101398712 B1 | 5/2014 |
| KR | 101400734 B1 | 5/2014 |
| KR | 20140058169 A | 5/2014 |
| KR | 101409502 B1 | 6/2014 |
| KR | 101413175 B1 | 6/2014 |
| RU | 2129131 C1 | 4/1999 |
| RU | 2176254 C1 | 11/2001 |
| RU | 2232168 C2 | 7/2004 |
| RU | 2255947 C1 | 7/2005 |
| RU | 2324727 C1 | 5/2008 |
| RU | 2339657 C1 | 11/2008 |
| RU | 2395542 C2 | 7/2010 |
| RU | 2408616 C2 | 1/2011 |
| RU | 2471820 C2 | 1/2013 |
| RU | 2479603 C2 | 4/2013 |
| RU | 2479604 C2 | 4/2013 |
| WO | WO9909092 A1 | 2/1999 |
| WO | WO0210271 A2 | 2/2002 |
| WO | WO05044545 A1 | 5/2005 |
| WO | WO06037278 A1 | 4/2006 |
| WO | WO06077649 A1 | 7/2006 |
| WO | WO06107179 A2 | 10/2006 |
| WO | WO08060302 A1 | 5/2008 |
| WO | WO08071361 A1 | 6/2008 |
| WO | WO08145155 A1 | 12/2008 |
| WO | WO09019684 A2 | 2/2009 |
| WO | 2009112220 A1 | 9/2009 |
| WO | WO09155747 A1 | 12/2009 |
| WO | WO11045463 A1 | 4/2011 |
| WO | 2011092122 A1 | 8/2011 |
| WO | 2011092124 A1 | 8/2011 |
| WO | 2011092125 A1 | 8/2011 |
| WO | WO11092179 A1 | 8/2011 |
| WO | WO11093104 A1 | 8/2011 |
| WO | 2011123406 A1 | 10/2011 |
| WO | WO11123406 A1 | 10/2011 |
| WO | 11158509 A1 | 12/2011 |
| WO | WO11158024 A1 | 12/2011 |
| WO | WO11158509 A1 | 12/2011 |
| WO | 2012069567 A1 | 5/2012 |
| WO | 2012069585 A1 | 5/2012 |
| WO | 2012115528 A2 | 8/2012 |
| WO | WO12114667 A1 | 8/2012 |
| WO | WO12115528 A2 | 8/2012 |
| WO | WO12117429 A1 | 9/2012 |
| WO | WO12134266 A2 | 10/2012 |
| WO | WO12146611 A1 | 11/2012 |
| WO | 2013039498 A1 | 3/2013 |
| WO | 2013040425 A1 | 3/2013 |
| WO | WO13039499 A1 | 3/2013 |
| WO | 2013092340 A1 | 6/2013 |
| WO | WO13092096 A1 | 6/2013 |
| WO | WO13092340 A1 | 6/2013 |
| WO | WO13093608 A1 | 6/2013 |
| WO | 2013147827 A1 | 10/2013 |
| WO | WO13147827 A1 | 10/2013 |
| WO | WO13152980 A1 | 10/2013 |
| WO | WO13172699 A1 | 11/2013 |
| WO | WO13189917 A2 | 12/2013 |
| WO | WO14067827 A1 | 5/2014 |
| WO | WO14067828 A1 | 5/2014 |
| WO | WO14068486 A1 | 5/2014 |
| WO | WO14098155 A1 | 6/2014 |

OTHER PUBLICATIONS

English Abstract of CN103012840B, dated Jan. 29, 2014.
English Abstract of CN103044736A, dated Apr. 17, 2013.
English Abstract of CN103333378A, dated Oct. 2, 2013.
English Abstract of CN103360622A, dated Oct. 23, 2013.
English Abstract of CN103450504A, dated Dec. 18, 2013.
English Abstract of CN103524793A, dated Jan. 22, 2014.
English Abstract of CN103554560A, dated Feb. 5, 2014.
English Abstract of CN103627092A, dated Mar. 12, 2014.
English Abstract of CN103665285A, dated Mar. 26, 2014.
English Abstract of CN103665287A, dated Mar. 26, 2014.
English Abstract of CN103804728A, dated May 21, 2014.
English Abstract of CN103804729A, dated May 21, 2014.
English Abstract of CN103819720A, dated May 28, 2014.
English Abstract of CN103834076A, dated Jun. 4, 2014.
English Abstract of CN103849017A, dated Jun. 11, 2014.
English Abstract of CN103881157A, dated Jun. 25, 2014.
English Abstract of CN103881163A, dated Jun. 25, 2014.
English Abstract of CN103911230A, dated Jul. 9, 2014.
English Abstract of CN103923368A, dated Jul. 16, 2014.
English Abstract of CN103980581A, dated Aug. 13, 2014.
English Abstract of CN103992507A, dated Aug. 20, 2014.
English Abstract of CN103992537A, dated Aug. 20, 2014.
English Abstract of CN104004223A, dated Aug. 27, 2014.
English Abstract of CN104004244A, dated Aug. 27, 2014.
English Abstract of CN104004245A, dated Aug. 27, 2014.
English Abstract of CN104004246A, dated Aug. 27, 2014.
English Abstract of CN104004247A, dated Aug. 27, 2014.
English Abstract of CN1408752A, dated Apr. 9, 2003.
English Abstract of DE102004005132A1, dated Aug. 18, 2005.
English Abstract of DE102008027694A1, dated Dec. 17, 2009.
English Abstract of DE102008037593A1, dated May 27, 2010.
English Abstract of DE19963781A1, dated Apr. 27, 2000.
English Abstract of DE19700967C2, dated Apr. 27, 2000.
English Abstract of EA008517B1, dated Jun. 29, 2007.
English Abstract of EP0861869B1, dated Nov. 2, 2000.
English Abstract of EP0921150B1, dated Apr. 9, 2003.
English Abstract of EP1085049B1, dated May 12, 2004.
English Abstract of EP1270657B1, dated Mar. 29, 2006.
English Abstract of EP1439205B1, dated Apr. 20, 2005.
English Abstract of EP1526002B1, dated Sep. 12, 2007.
English Abstract of EP1626062A1, dated Feb. 15, 2006.
English Abstract of EP2088169A1, dated Aug. 12, 2009.
English Abstract of EP2098564A1, dated Sep. 9, 2009.
English Abstract of EP2163575B1, dated Oct. 19, 2011.
English Abstract of EP2218750A1, dated Aug. 18, 2010.
English Abstract of EP2246200A1, dated Nov. 3, 2010.
English Abstract of EP2284023B1, dated Mar. 14, 2012.
English Abstract of EP2512825A1, dated Oct. 24, 2012.
English Abstract of EP2512826A1, dated Oct. 24, 2012.
English Abstract of EP2547726A1, dated Jan. 23, 2013.
English Abstract of EP2626384A1, dated Aug. 14, 2013.
English Abstract of EP2655089A1, dated Oct. 30, 2013.
English Abstract of EP2674452A1, dated Dec. 18, 2013.
English Abstract of JP10279735A2, dated Oct. 20, 1998.
English Abstract of JP2000239452A2, dated Sep. 5, 2000.
English Abstract of JP2000344948A2, dated Dec. 12, 2000.
English Abstract of JP2000351874A2, dated Dec. 19, 2000.
English Abstract of JP2001049032A2, dated Feb. 20, 2001.
English Abstract of JP2001049045A2, dated Feb. 20, 2001.
English Abstract of JP2001098115A2, dated Apr. 10, 2001.
English Abstract of JP2001158835A2, dated Jun. 12, 2001.
English Abstract of JP2001233997A2, dated Aug. 28, 2001.
English Abstract of JP2002037925A2, dated Feb. 6, 2002.
English Abstract of JP2002256111A2, dated Sep. 11, 2002.
English Abstract of JP2002327093A2, dated Nov. 15, 2002.
English Abstract of JP2002338736A2, dated Nov. 27, 2002.
English Abstract of JP2003155381A2, dated May 27, 2003.

(56) References Cited

OTHER PUBLICATIONS

English Abstract of JP2003238744A2, dated Aug. 27, 2003.
English Abstract of JP2003246883A2, dated Sep. 5, 2003.
English Abstract of JP2003292686A2, dated Oct. 15, 2003.
English Abstract of JP2003327747A2, dated Nov. 19, 2003.
English Abstract of JP2003327749A2, dated Nov. 19, 2003.
English Abstract of JP2004027028A2, dated Jan. 29, 2004.
English Abstract of JP2004051754A2, dated Feb. 19, 2004.
English Abstract of JP2004204147A2, dated Jul. 22, 2004.
English Abstract of JP2005226040A2, dated Aug. 25, 2005.
English Abstract of JP2005226041A2, dated Aug. 25, 2005.
English Abstract of JP2005232355A2, dated Sep. 2, 2005.
English Abstract of JP2006063094A2, dated Mar. 9, 2006.
English Abstract of JP2006232880A2, dated Sep. 7, 2006.
English Abstract of JP2006241216A2, dated Sep. 14, 2006.
English Abstract of JP2006291103A2, dated Oct. 26, 2006.
English Abstract of JP2007099874A2, dated Apr. 19, 2007.
English Abstract of JP2007112847A2, dated May 10, 2007.
English Abstract of JP2007197004A2, dated Aug. 9, 2007.
English Abstract of JP2007231085A2, dated Sep. 13, 2007.
English Abstract of JP2007269259A2, dated Oct. 18, 2007.
English Abstract of JP2007284482A2, dated Nov. 1, 2007.
English Abstract of JP2007302813A2, dated Nov. 22, 2007.
English Abstract of JP2008138140A2, dated Jun. 19, 2008.
English Abstract of JP2008144117A2, dated Jun. 26, 2008.
English Abstract of JP2008150413A2, dated Jul. 3, 2008.
English Abstract of JP2008150426A2, dated Jul. 3, 2008.
English Abstract of JP2008150435A2, dated Jul. 3, 2008.
English Abstract of JP2008189880A2, dated Aug. 21, 2008.
English Abstract of JP2008201827A2, dated Sep. 4, 2008.
English Abstract of JP2008255248A2, dated Oct. 23, 2008.
English Abstract of JP2008266381A2, dated Nov. 6, 2008.
English Abstract of JP2008280438A2, dated Nov. 20, 2008.
English Abstract of JP2009035603A2, dated Feb. 19, 2009.
English Abstract of JP2009040904A2, dated Feb. 26, 2009.
English Abstract of JP2009108117A2, dated May 21, 2009.
English Abstract of JP2009114257A2, dated May 28, 2009.
English Abstract of JP2009120739A2, dated Jun. 4, 2009.
English Abstract of JP2009242538A2, dated Oct. 22, 2009.
English Abstract of JP2009263403A2, dated Nov. 12, 2009.
English Abstract of JP2009263536A2, dated Nov. 12, 2009.
English Abstract of JP2010209174A2, dated Sep. 24, 2010.
English Abstract of JP2010248338A2, dated Nov. 4, 2010.
English Abstract of JP2010265431A2, dated Nov. 25, 2010.
English Abstract of JP2010285545A2, dated Dec. 24, 2010.
English Abstract of JP2011038058A2, dated Feb. 24, 2011.
English Abstract of JP2011052103A2, dated Mar. 17, 2011.
English Abstract of JP2011063692A2, dated Mar. 31, 2011.
English Abstract of JP2011089081A2, dated May 6, 2011.
English Abstract of JP2011148897A2, dated Aug. 4, 2011.
English Abstract of JP2011231166A2, dated Nov. 17, 2011.
English Abstract of JP2012092263A2, dated May 17, 2012.
English Abstract of JP2012131860A2, dated Jul. 12, 2012.
English Abstract JP2012149132A2, dated Aug. 9, 2012.
English Abstract of JP2012149133A2, dated Aug. 9, 2012.
English Abstract of JP2012149146A2, dated Aug. 9, 2012.
English Abstract of JP2013075930A2, dated Apr. 25, 2013.
English Abstract of JP2013075931A2, dated Apr. 25, 2013.
English Abstract of JP2013075932A2, dated Apr. 25, 2013.
English Abstract of JP2013075933A2, dated Apr. 25, 2013.
English Abstract of JP2013075934A2, dated Apr. 25, 2013.
English Abstract of JP2013159714A2, dated Aug. 19, 2013.
English Abstract of JP2013170233A2, dated Sep. 2, 2013.
English Abstract of JP2013185012A2, dated Sep. 19, 2013.
English Abstract of JP2013256564A2, dated Dec. 26, 2013.
English Abstract of JP2014015516A2, dated Jan. 30, 2014.
English Abstract of JP2014015535A2, dated Jan. 30, 2014.
English Abstract of JP2014024995A2, dated Feb. 6, 2014.
English Abstract of JP2014065798A2, dated Apr. 17, 2014.
English Abstract of JP2014065799A2, dated Apr. 17, 2014.
English Abstract of JP3379900B2, dated Feb. 24, 2003.
English Abstract of JP3594149B2, dated Nov. 24, 2004.
English Abstract of JP3602946B2, dated Dec. 15, 2004.
English Abstract of JP3732625B2, dated Jan. 5, 2006.
English Abstract of JP3785541B2, dated Jun. 14, 2006.
English Abstract of JP3839130B2, dated Nov. 1, 2006.
English Abstract of JP3874471B2, dated Jan. 31, 2007.
English Abstract of JP3936052B2, dated Jun. 27, 2007.
English Abstract of JP3979862B2, dated Sep. 19, 2007.
English Abstract of JP4028772B2, dated Dec. 26, 2007.
English Abstract of JP4059691B2, dated Mar. 12, 2008.
English Abstract of JP4063578B2, dated Mar. 19, 2008.
English Abstract of JP4067332B2, dated Mar. 26, 2008.
English Abstract of JP4222800B2, dated Feb. 12, 2009.
English Abstract of JP4255160B2, dated Apr. 15, 2009.
English Abstract of JP4409971B2, dated Feb. 3, 2010.
English Abstract of JP4433264B2, dated Mar. 17, 2010.
English Abstract of JP4448067B2, dated Apr. 7, 2010.
English Abstract of JP4448225B2, dated Apr. 7, 2010.
English Abstract of JP4504654B2, dated Jul. 14, 2010.
English Abstract of JP4607042B2, dated Jan. 5, 2011.
English Abstract of JP4621320B2, dated Jan. 26, 2011.
English Abstract of JP4641214B2, dated Mar. 2, 2011.
English Abstract of JP4708209B2, dated Jun. 22, 2011.
English Abstract of JP4718681B2, dated Jul. 6, 2011.
English Abstract of JP4857694B2, dated Jan. 18, 2012.
English Abstract of JP4970755B2, dated Jul. 11, 2012.
English Abstract of JP5002194B2, dated Aug. 15, 2012.
English Abstract of JP5019745B2, dated Sep. 5, 2012.
English Abstract of JP5043622B2, dated Oct. 10, 2012.
English Abstract of JP5062584B2, dated Oct. 31, 2012.
English Abstract of JP5079261B2, dated Nov. 21, 2012.
English Abstract of JP5089852B2, dated Dec. 5, 2012.
English Abstract of JP5132606B2, dated Jan. 30, 2013.
English Abstract of JP5148374B2, dated Feb. 20, 2013.
English Abstract of JP5179732B2, dated Apr. 10, 2013.
English Abstract of JP5198774B2, dated May 15, 2013.
English Abstract of JP5236254B2, dated Jul. 17, 2013.
English Abstract of JP5248211B2, dated Jul. 31, 2013.
English Abstract of JP5282377B2, dated Sep. 4, 2013.
English Abstract of JP5295610B2, dated Sep. 18, 2013.
English Abstract of JP5306576B2, dated Oct. 2, 2013.
English Abstract of JP5358880B2, dated Dec. 4, 2013.
English Abstract of JP5358881B2, dated Dec. 4, 2013.
English Abstract of JP5389527B2, dated Jan. 15, 2014.
English Abstract of JP5394026B2, dated Jan. 22, 2014.
English Abstract of JP5394681B2, dated Jan. 22, 2014.
English Abstract of JP5420300B2, dated Feb. 19, 2014.
English Abstract of JP5436820B2, dated Mar. 5, 2014.
English Abstract of JP5442489B2, dated Mar. 12, 2014.
English Abstract of JP5474293B2, dated Apr. 16, 2014.
English Abstract of JP5474478B2, dated Apr. 16, 2014.
English Abstract of JP5475579B2, dated Apr. 16, 2014.
English Abstract of JP5480790B2, dated Apr. 23, 2014.
English Abstract of JP5487809B2, dated May 14, 2014.
English Abstract of JP5499728B2, dated May 21, 2014.
English Abstract of JP5503245B2, dated May 28, 2014.
English Abstract of JP5515867B2, dated Jun. 11, 2014.
English Abstract of JP5540534B2, dated Jul. 2, 2014.
English Abstract of JP5545102B2, dated Jul. 9, 2014.
English Abstract of JP5567454B2, dated Aug. 6, 2014.
English Abstract of JP8176351A2, dated Jul. 9, 1996.
English Abstract of JP8176397A2, dated Jul. 9, 1996.
English Abstract of JP9067472A2, dated Mar. 11, 1997.
English Abstract of JP9208604A2, dated Aug. 12, 1997.
English Abstract of KR100198917B1, dated Jun. 15, 1999.
English Abstract of KR100270515B1, dated Mar. 2, 2001.
English Abstract of KR100319988B1, dated Jan. 10, 2002.
English Abstract of KR100347805B1, dated Aug. 7, 2002.
English Abstract of KR100372746B1, dated Feb. 17, 2003.
English Abstract of KR100411015B1, dated Dec. 18, 2003.
English Abstract of KR100481698B1, dated Apr. 11, 2005.
English Abstract of KR100502046B1, dated Jul. 18, 2005.

(56) References Cited

OTHER PUBLICATIONS

English Abstract of KR100505326B1, dated Oct. 12, 2005.
English Abstract of KR100553996B1, dated Feb. 22, 2006.
English Abstract of KR100592987B1, dated Jun. 23, 2006.
English Abstract of KR100593021B1, dated Jun. 26, 2006.
English Abstract of KR100606942B1, dated Aug. 1, 2006.
English Abstract of KR100635601B1, dated Oct. 18, 2006.
English Abstract of KR100635615B1, dated Oct. 18, 2006.
English Abstract of KR100650011B1, dated Nov. 27, 2006.
English Abstract of KR100655222B1, dated Dec. 8, 2006.
English Abstract of KR100656551B1, dated Dec. 13, 2006.
English Abstract of KR100656552B1, Dec. 13, 2006.
English Abstract of KR100668628B1, dated Jan. 16, 2007.
English Abstract of KR100668629B1, dated Jan. 16, 2007.
English Abstract of KR100692562B1, dated Mar. 13, 2007.
English Abstract of KR100698392B1, dated Mar. 23, 2007.
English Abstract of KR100714976B1, dated May 7, 2007.
English Abstract of KR100738669B1, dated Jul. 11, 2007.
English Abstract of KR100738670B1, dated Jul. 11, 2007.
English Abstract of KR100738671B1, dated Jul. 11, 2007.
English Abstract of KR100738672B1, dated Jul. 11, 2007.
English Abstract of KR100738673B1, dated Jul. 11, 2007.
English Abstract of KR100738674B1, dated Jul. 11, 2007.
English Abstract of KR100746328B1, dated Aug. 3, 2007.
English Abstract of KR100746336B1, dated Aug. 3, 2007.
English Abstract of KR100750948B1, dated Aug. 22, 2007.
English Abstract of KR100781592B1, dated Dec. 3, 2007.
English Abstract of KR100797068B1, dated Jan. 22, 2008.
English Abstract of KR100846359B1, dated Jul. 15, 2008.
English Abstract of KR100885080B1, dated Feb. 25, 2009.
English Abstract of KR100902345B1, dated Jun. 12, 2009.
English Abstract of KR100964308B1, dated Jun. 16, 2010.
English Abstract of KR100964310B1, dated Jun. 16, 2010.
English Abstract of KR101008605B1, dated Jan. 17, 2011.
English Abstract of KR101023759B1, dated Mar. 21, 2011.
English Abstract of KR101053061B1, dated Aug. 1, 2011.
English Abstract of KR101122193B1, dated Mar. 19, 2012.
English Abstract of KR101132811B1, dated Apr. 2, 2012.
English Abstract of KR101132814B1, dated Apr. 2, 2012.
English Abstract of KR101278216B1, dated Jul. 1, 2013.
English Abstract of KR101313732B1, dated Oct. 1, 2013.
English Abstract of KR101314581B1, dated Oct. 7, 2013.
English Abstract of KR101398712B1, dated May 27, 2014.
English Abstract of KR101400734B1, dated May 29, 2014.
English Abstract of KR101409502B1, dated Jun. 18, 2014.
English Abstract of KR101413175B1, dated Jun. 27, 2014.
English Abstract of KR19980070789A, dated Oct. 26, 1998.
English Abstract of KR20020037595A, dated May 22, 2002.
English Abstract of KR20020064038A, dated Aug. 7, 2002.
English Abstract of KR20030030138A, dated Apr. 18, 2003.
English Abstract of KR20040008442A, dated Jan. 31, 2004.
English Abstract of KR20090030415A, dated Mar. 25, 2009.
English Abstract of KR20090116171A, dated Nov. 11, 2009.
English Abstract of KR20100048140A, dated May 11, 2010.
English Abstract of KR20110072260A, dated Jun. 29, 2011.
English Abstract of KR20110088125A, dated Aug. 3, 2011.
English Abstract of KR20120048377A, dated May 15, 2012.
English Abstract of KR20120097592A, dated Sep. 5, 2012.
English Abstract of KR20140058169A, dated May 14, 2014.
English Abstract of RU2129131C1, dated Apr. 20, 1999.
English Abstract of RU2176254C1, dated Nov. 27, 2001.
English Abstract of RU2232168C2, dated Jul. 10, 2004.
English Abstract of RU2255947C1, dated Jul. 10, 2005.
English Abstract of RU2324727C1, dated May 20, 2008.
English Abstract of RU2339657C1, dated Nov. 27, 2008.
English Abstract of RU2395542C2, dated Jul. 27, 2010.
English Abstract of RU2408616C2, dated Jan. 10, 2011.
English Abstract of RU2471820C2, dated Jan. 10, 2013.
English Abstract of RU2479603C2, dated Apr. 20, 2013.
English Abstract of RU2479604C2, dated Apr. 20, 2013.
English Abstract of WO06037278A1, dated Apr. 13, 2006.
English Abstract of WO06077649A1, dated Jul. 27, 2006.
English Abstract of WO08071361A1, dated Jun. 19, 2008.
English Abstract of WO11045463A1, dated Apr. 21, 2011.
English Abstract of WO11092179A1, dated Aug. 4, 2011.
English Abstract of WO11093104A1, dated Aug. 4, 2011.
English Abstract of WO11158509A1, dated Dec. 22, 2011.
English Abstract of WO12114667A1, dated Aug. 30, 2012.
English Abstract of WO12146611A1, dated Nov. 1, 2012.
English Abstract of WO13092096A1, dated Jun. 27, 2013.
English Abstract of WO13092340A1, dated Jun. 27, 2013.
English Abstract of WO13152980A1, dated Oct. 17, 2013.
English Abstract of WO14067827A1, dated May 8, 2014.
English Abstract of WO14067828A1, dated May 8, 2014.
English Abstract of WO14098155A1, dated Jun. 26, 2014.
Struktol Rubber Handbook, 146 pages, dated Sep. 2004.

\* cited by examiner

PLANT OIL-CONTAINING RUBBER COMPOSITIONS, TREAD THEREOF AND RACE TIRES CONTAINING THE TREAD

FIELD

The present application is directed to rubber compositions comprising at least one elastomer; reinforcing filler comprising carbon black, silica, or a combination thereof; at least one hydrocarbon resin; and at least one plant oil and optionally at least one additional oil, wherein the total amount of reinforcing filler is at least 25% by weight of the rubber composition and the total amount of oil is at least 60 phr and comprises about 15 to about 35% by weight of the rubber composition. The rubber compositions are useful in tire treads, particularly tire treads for race tires.

BACKGROUND

Rubber compositions intended for use in race tire treads may contain varying amounts of one or more oils added to the composition in the form of processing oil, extender oil for an elastomer or a combination of both. Traditionally, these oils have been sourced from petroleum products.

SUMMARY

Disclosed herein are rubber compositions comprising at least one elastomer; reinforcing filler comprising carbon black, silica, or a combination thereof; at least one hydrocarbon resin; and at least one plant oil and optionally at least one additional oil, wherein the total amount of reinforcing filler is at least 25% by weight of the rubber composition and the total amount of oil is at least 60 phr and comprises about 15 to about 35% by weight of the rubber composition. The rubber compositions are useful in tire treads, particularly tire treads for race tires.

The first embodiment disclosed herein is directed to a rubber composition comprising: 100 parts by weight of at least one elastomer; about 65 to about 150 phr of reinforcing filler comprising carbon black filler, silica, or a combination thereof; about 5 to about 70 phr of at least one hydrocarbon resin; about 20 to about 100 phr of at least one plant oil and optionally at least one additional oil, wherein the total amount of reinforcing filler is at least about 25% by weight of the rubber composition, and the total amount of oil in the rubber composition is at least 60 phr and comprises about 15 to about 35% by weight of the rubber composition.

The second embodiment disclosed herein is directed to a race tire tread comprising the rubber composition of the first embodiment.

The third embodiment disclosed herein is directed to a race tire having a tread comprising the rubber composition of the first embodiment.

The fourth embodiment disclosed herein is directed to a car having at least one wheel mounted with a race tire according to the third embodiment.

DETAILED DESCRIPTION

Disclosed herein are rubber compositions comprising at least one elastomer; reinforcing filler comprising carbon black, silica, or a combination thereof; at least one hydrocarbon resin; and at least one plant oil and optionally at least one additional oil, wherein the total amount of reinforcing filler is at least 25% by weight of the rubber composition and the total amount of oil is at least 60 phr and comprises about 15 to about 35% by weight of the rubber composition. The rubber compositions are useful in tire treads, particularly tire treads for race tires.

The first embodiment disclosed herein is directed to a rubber composition comprising: 100 parts by weight of at least one elastomer; about 65 to about 150 phr of reinforcing filler comprising carbon black filler, silica, or a combination thereof; about 5 to about 70 phr of at least one hydrocarbon resin; about 20 to about 100 phr of at least one plant oil and optionally at least one additional oil, wherein the total amount of reinforcing filler is at least about 25% by weight of the rubber composition, and the total amount of oil in the rubber composition is at least 60 phr and comprises about 15 to about 35% by weight of the rubber composition.

The second embodiment disclosed herein is directed to a race tire tread comprising the rubber composition of the first embodiment.

The third embodiment disclosed herein is directed to a race tire having a tread comprising the rubber composition of the first embodiment.

The fourth embodiment disclosed herein is directed to a car having at least one wheel mounted with a race tire according to the third embodiment.

DEFINITIONS

The terminology as set forth herein is for description of the embodiments only and should not be construed as limiting the invention as a whole.

As used herein, the term "phr" means parts per one hundred parts rubber.

As used herein, the term "polybutadiene" is used to indicate a polymer that is manufactured from cis-1,3-butadiene monomers. The term polybutadiene is also used interchangeably with the phrase "polybutadiene rubber" and the abbreviation "BR."

As used herein, the term "polyisoprene" means synthetic polyisoprene. In other words, the term is used to indicate a polymer that is manufactured from isoprene monomers, and should not be construed as including naturally occurring natural rubber (e.g., Hevea natural rubber, guayule-sourced natural rubber or dandelion-sourced natural rubber). The term polyisoprene is also used interchangeably with the phrase "polyisoprene rubber" and the abbreviation "IR."

As used herein, the term "styrene-butadiene rubber" or "SBR" means a copolymer manufactured from styrene and cis-1,3-butadiene monomers.

As used herein, the term "natural rubber" or "NR" means naturally occurring rubber such as can be harvested from sources such as Hevea rubber trees, and non-Hevea source (e.g., guayule shrubs, and dandelions (e.g., TKS)). In other words, the term "natural rubber" should not be construed as including polyisoprene.

As used herein, the term "race tire" means a tire used on closed course racing tracks. In other words, a race tire is not used (or at least not intended for use) on public highways or streets. In certain embodiments, the race tire contains marking indicating that it is for racing purposes only, not for highway use, or both, or similar language (e.g., only for racing use, only for race use, not for street use, not intended for highway use).

As used herein, unless indicated to the contrary, "room temperature" indicates 23° C.

For the purpose of this disclosure, any reference to a percent amount of a component in the rubber composition means a percent by weight, unless otherwise specified.

Similarly, any reference to ratios of component amounts in the rubber composition means the ratios by weight, unless otherwise specified.

Elastomer

As discussed above, the rubber compositions of the first-fourth embodiments disclosed herein comprise 100 parts by weight of at least one elastomer. These rubber compositions can be understood as comprising 100 parts of at least one elastomer (which can alternatively be expressed as 100 phr). The at least one elastomer can be selected from natural rubber(s), synthetic rubber(s), or combinations thereof. Suitable elastomers for use in the rubber composition are well known to those skilled in the art and include but are not limited to the following: synthetic polyisoprene rubber, natural rubber, styrene-butadiene rubber (SBR), styrene-isoprene rubber, butadiene-isoprene-rubber, styrene-isoprene-butadiene rubber, polybutadiene, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, tetrafluoroethylene-propylene rubber, and combinations thereof. Examples of fluorinated rubber include perfluoroelastomer rubber, fluoroelastomer, fluorosilicone, and tetrafluoroethylene-propylene rubber.

In certain embodiments of the first-fourth embodiments disclosed herein, the rubber composition is formulated such that at least a majority (by weight) of the at least one elastomer comprises at least one of: natural rubber, polyisoprene rubber, polybutadiene rubber, and styrene-butadiene rubber; in such embodiments, one or more than one type of any of the foregoing rubbers can be utilized and/or one or more than one of each type can also be utilized. In certain embodiments, at least 60% by weight (at least 60 parts or phr), at least 70% by weight (at least 70 parts or phr), at least 80% by weight (at least 80 parts or phr), at least 90% by weight (at least 90 parts or phr), at least 95% by weight (at least 95 parts phr), or even 100% by weight (100 parts or phr) of the rubber comprises at least one of: natural rubber, synthetic polyisoprene rubber, polybutadiene rubber, and styrene-butadiene rubber. In certain embodiments of the first-fourth embodiments disclosed herein, all 100 parts of the at least one elastomer comprise one or more random elastomers (i.e., exclude any block polymers or block copolymers); as those of skill in the art will understood random elastomers may preferably be produced in the presence of a randomizing agent (e.g., dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N', N'-tetramethyl ethylenediamine, 1,2-dipiperidinoethane, potassium-t-amylate, potassium-t-butoxide, sodium-t-amylate). In certain embodiments of the first-fourth embodiments disclosed herein, all 100 parts of the at least one elastomer comprise one or more polymers or copolymers and less than 5 parts or 0 parts of any terpolymer. In certain embodiments of the first-fourth embodiments disclosed herein, the 100 parts of the at least one elastomer comprises less than 5 parts or 0 parts of any epoxidized natural rubber. In certain embodiments of the first-fourth embodiments disclosed herein, the 100 parts of the at least one elastomer comprises less than 5 parts or 0 parts of any functionalized natural rubber or functionalized polyisoprene. In certain embodiments of the first-fourth embodiments disclosed herein, the 100 parts of the at least one elastomer comprises less than 50 parts of natural rubber. In certain embodiments of the first-fourth embodiments disclosed herein, the 100 parts of the at least one elastomer comprises less than 20 parts, less than 10 parts, less than 5 parts or 0 parts of any elastomer functionalized with a silica-reactive functional group.

In certain embodiments of the first-fourth embodiments disclosed herein, the rubber composition is formulated such that the at least one elastomer comprises a polymer, a copolymer, or a combination thereof (i.e., more than one polymer, more than one copolymer, one polymer and one copolymer, more than one polymer and one copolymer, more than one copolymer and one polymer, or more than one copolymer and more than one polymer) when more than one rubber is utilized. In certain embodiments of the first-fourth embodiments disclosed herein, the at least one elastomer includes at least one conjugated diene monomer-containing polymer or copolymer. Examples of suitable conjugated diene monomers according to certain embodiments of the first-fourth embodiments disclosed herein include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, derivatives thereof, and combinations thereof. It should be understood that mixtures of two or more conjugated diene monomers may be utilized for the rubber(s) or polymer(s) in the rubber compositions of certain embodiments of the first-fourth embodiments disclosed herein. In certain embodiments of the first-fourth embodiments disclosed herein, the at least one elastomer is at least one of: styrene-butadiene rubber, polybutadiene, synthetic polyisoprene rubber, and natural rubber.

As discussed above, in certain embodiments according to the first-fourth embodiments disclosed herein, the rubber composition is formulated such that the at least one elastomer comprises polybutadiene. In certain embodiments according to the first-fourth embodiments disclosed herein, the polybutadiene comprises a high cis polybutadiene. In certain embodiments according to the first-fourth embodiments disclosed herein, the high cis polybutadiene has a cis 1,4-bond content of 85% of greater, 90% or greater, 92% or greater, or 95% or greater. In certain embodiments of the first-fourth embodiments disclosed herein, the polybutadiene has a cis 1,4-bond content of 85-99%, 90-99%, 90-98%, 90-97%, 92-99%, 92-98%, 92-97%, 95-99%, 95-98%, or 95-97%.

As discussed above, in certain embodiments according to the first-fourth embodiments disclosed herein, the rubber composition is formulated such that the at least one elastomer comprises polyisoprene. In certain embodiments according to the first-fourth embodiments disclosed herein, the polyisoprene comprises high cis polyisoprene. In certain embodiments according to the first-fourth embodiments disclosed herein, the high cis polyisoprene has a cis 1,4-bond content of 90% of greater. In certain embodiments of the first-fourth embodiments disclosed herein, the polyisoprene has a cis 1,4-bond content of 90% or greater, 92% or greater, or 95% or greater. In certain embodiments of the first-fourth embodiments disclosed herein, the polyisoprene has a cis 1,4-bond content of 90-99%, 90-98%, 90-97%, 92-99%, 92-98%, 92-97%, 95-99%, 95-98%, or 95-97%.

As discussed above, in certain embodiments according to the first-fourth embodiments disclosed herein, the rubber composition is formulated such that the at least one elastomer comprises the copolymer styrene-butadiene rubber (SBR). SBR is a copolymer of styrene and butadiene monomers. In certain embodiments according to the first-fourth embodiments disclosed herein, the SBR used in the rubber composition comprises about 10 to about 50% styrene monomer and about 50 to about 90% butadiene monomer by weight. Generally, SBR is produced by solution or emulsion polymerization methods; however, it should be understood that the particular method by which the SBR is produced is not limited. The styrene and butadiene monomer content in a given SBR copolymer can be determined by standard and well-established analytical methods such as infrared spectroscopy.

Numerous commercial sources of the foregoing rubbers are well-known. As non-limiting examples, Firestone Polymers offers various grades of its Diene™ polybutadiene which have varying cis 1,4-bond contents (e.g., 40% and 96%) as well as various grades of its Duradene™ solution polymerized styrene-butadiene copolymer. Other commercial sources of the rubbers are well known, including sources for emulsion polymerized styrene-butadiene copolymer, functionalized versions of styrene-butadiene copolymer, neoprene, polybutadiene, synthetic polyisoprene rubber, and natural rubber.

In certain embodiments according to the first-fourth embodiments disclosed herein, the rubber composition is formulated such that the at least one elastomer of the rubber composition comprises a functionalized polymer. In certain such embodiments, the rubber composition comprises about 5 to about 100 parts or phr (e.g., 5 parts or phr, 10 parts or phr, 15 parts or phr, 20 parts or phr, 25 parts or phr, 30 parts or phr, 35 parts or phr, 40 parts or phr, 45 parts or phr, 50 parts or phr, 55 parts or phr, 60 parts or phr, 65 parts or phr, 70 parts or phr, 75 parts or phr, 80 parts or phr, 85 parts or phr, 90 parts or phr, 95 parts or phr, 100 parts or phr) of at least one functionalized polymer, including 5 phr to 100 phr, about 10 to about 90 phr, 10 phr to 90 phr, about 10 to about 70 phr, 10 phr to 70 phr, about 10 to about 50 phr, and 10 phr to 50 phr. In certain embodiments according to the first-fourth embodiments disclosed herein, the functionalized polymer comprises a polymer with a silica-reactive functional group, a nitrogen-containing functional group, an oxygen-containing functional group, a sulfur-containing functional group, or a combination of the foregoing. Non-limiting examples of silica-reactive functional groups that are known to be utilized in functionalizing conjugated diene polymers and are suitable for use in the rubber compositions of certain embodiments of the first-fourth embodiments disclosed herein include nitrogen-containing functional groups, silicon-containing functional groups, oxygen or sulfur-containing functional groups, and metal-containing functional groups. As used herein, the term functionalized polymer should be understood to include polymers (including conjugated diene monomer-containing polymer or copolymer rubbers) with a functional group at one or both terminus (e.g., from use of a functionalized initiator, a functionalized terminator, or both), a functional group in the main chain of the polymer, and combinations thereof. For example, a silica-reactive functionalized polymer may have the functional group at one or both terminus, in the main chain thereof, or both in the main chain and at one or both terminus.

Non-limiting examples of nitrogen-containing functional groups that are known to be utilized in functionalizing elastomers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first-fourth embodiments disclosed herein, the rubber composition comprises a functionalized conjugated diene monomer-containing polymer or copolymer rubber having at least one functional group selected from the foregoing list.

Non-limiting examples of silicon-containing functional groups that are known to be utilized in functionalizing elastomers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing rubbers also include those disclosed in U.S. Pat. No. 6,369,167, the entire disclosure of which is hereby incorporated by reference. In certain embodiments according to the first-fourth embodiments disclosed herein, the rubber composition comprises a functionalized rubber having at least one functional group selected from the foregoing list.

Non-limiting examples of oxygen or sulfur-containing functional groups that are known to be utilized in functionalizing elastomers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. In certain embodiments, the foregoing alkoxy group may be an alcohol-derived alkoxy group derived from a benzophenone. In certain embodiments according to the first-fourth embodiments disclosed herein, the rubber composition comprises a functionalized conjugated diene monomer-containing polymer or copolymer rubber having at least one functional group selected from the foregoing list.

Generally, elastomers, including conjugated diene monomer-containing polymer or copolymer rubbers, may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism.

In the rubber compositions according to the first-fourth embodiments disclosed herein, the overall composition contains 100 phr (or 100 parts, either in total) of at least one elastomer. In other words, the total amount of all rubbers is considered to be 100 parts (by weight) and can be denoted 100 phr. Other components are added based upon 100 parts (in total) of rubber(s). As a non-limiting example, 60 parts of styrene-butadiene copolymer could be utilized along with 40 parts of polybutadiene polymer and 60 parts of silica; these amounts would be described herein as 60 phr or 60 parts of styrene-butadiene copolymer, 40 phr or 40 parts of polybutadiene polymer, and 60 phr of silica.

Reinforcing Filler

As discussed above, the rubber compositions of the first-fourth embodiments disclosed herein comprise about 65 to about 150 phr (including 65-150 phr, 65 phr, 70 phr, 75 phr, 80 phr, 85 phr, 90 phr, 95 phr, 100 phr, 105 phr, 110 phr, 115 phr, 120 phr, 125 phr, 130 phr, 135 phr, 140 phr, 145 phr and 150 phr) of reinforcing filler comprising carbon black, silica or a combination thereof and the total amount of reinforcing filler is at least about 25% by weight of the rubber composition. For the avoidance of doubt, the total amount of reinforcing filler is about 65 to about 150 phr and it comprises carbon black, silica, or a combination thereof; in other words, the about 65 to about 150 phr of reinforcing filler may comprise carbon black, silica, or carbon black and silica, and in each instance one or more than one additional reinforcing filler may optionally be included in the total amount of about 65 to about 150 phr. In the rubber compositions of the first-fourth embodiments disclosed herein, one or more than one carbon black may be utilized, one or more than one silica may be utilized, or one or more than one carbon black and one or more than one silica may be utilized, and in each instance one or more than one additional reinforcing filler may optionally be included in the total amount of 65 to about 150 phr. By stating that the total amount of reinforcing filler is at least about 25% by weight of the rubber composition is meant that when the total amount (by weight) of reinforcing filler is divided by the summed weight of all ingredients used to prepare the rubber composition and the quotient is multiplied by 100% that the number is at least 25%. As a non-limiting example, in a composition comprising 100 parts of carbon black and having a total weight of all ingredients (including the carbon black) of 350 parts, the amount of reinforcing filler is about 29% by weight.

In certain embodiments, the rubber compositions of the first-fourth embodiments comprise about 70 to about 150 phr, 70 to 150 phr, about 75 to about 150 phr, 75 to 150 phr, about 80 to about 150 phr, 80 phr to 150 phr, about 85 to about 150 phr, 85 to 150 phr, about 90 to about 150 phr, 90 to 150 phr, about 95 to about 150 phr, 95 to 150 phr, about 100 to about 150 phr, 100 to 150 phr, about 65 to about 140 phr, 65 to 140 phr, about 70 to about 140 phr, 70 to 140 phr, about 75 to about 140 phr, 75 to 140 phr, about 80 to about 140 phr, 80 phr to 140 phr, about 85 to about 140 phr, 85 to 140 phr, about 90 to about 140 phr, 90 to 140 phr, about 95 to about 140 phr, 95 to 140 phr, about 100 to about 140 phr, 100 to 140 phr, about 65 to about 130 phr, 65 to 130 phr, about 70 to about 130 phr, 70 to 130 phr, about 75 to about 130 phr, 75 to 130 phr, about 80 to about 130 phr, 80 phr to 130 phr, about 85 to about 130 phr, 85 to 130 phr, about 90 to about 130 phr, 90 to 130 phr, about 95 to about 130 phr, 95 to 130 phr, about 100 to about 130 phr, 100 to 130 phr, about 65 to about 120 phr, 65 to 120 phr, about 70 to about 120 phr, 70 to 120 phr, about 75 to about 120 phr, 75 to 120 phr, about 80 to about 120 phr, 80 phr to 120 phr, about 85 to about 120 phr, 85 to 120 phr, about 90 to about 120 phr, 90 to 120 phr, about 95 to about 120 phr, 95 to 120 phr, about 100 to about 120 phr, 100 to 120 phr, about 65 to about 110 phr, 65 to 110 phr, about 70 to about 110 phr, 70 to 110 phr, about 75 to about 110 phr, 75 to 110 phr, about 80 to about 110 phr, 80 phr to 110 phr, about 85 to about 110 phr, 85 to 110 phr, about 90 to about 110 phr, 90 to 110 phr, about 95 to about 110 phr, 95 to 110 phr, about 100 to about 110 phr, 100 to 110 phr, about 65 to about 100 phr, 65 to 100 phr, about 70 to about 100 phr, 70 to 100 phr, about 75 to about 100 phr, 75 to 100 phr, about 80 to about 100 phr, 80 phr to 100 phr, about 85 to about 100 phr, 85 to 100 phr, about 90 to about 100 phr, 90 to 100 phr, about 95 to about 100 phr, 95 to 100 phr, about 65 to about 90 phr, 65 to 90 phr, about 70 to about 90 phr, 70 to 90 phr, about 75 to about 90 phr, 75 to 90 phr, about 80 to about 90 phr, 80 phr to 90 phr, about 85 to about 90 phr, 85 to 90 phr, about 65 to about 80 phr, 65 to 80 phr, about 70 to about 80 phr, 70 to 80 phr, about 75 to about 80 phr, and 75 to 80 phr, each being total phr of reinforcing filler comprising carbon black, silica, or a combination thereof.

As used herein, the term "reinforcing" as used in the phrases "reinforcing carbon black filler," "reinforcing silica filler," and "reinforcing filler" generally should be understood to encompass both fillers that are traditionally described as reinforcing as well as fillers that may traditionally be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively (or additionally), the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler (as discussed below) and a reinforcing filler. In certain embodiments of the first-fourth embodiments disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the first-fourth embodiments disclosed herein, the term "reinforcing filler" is used to refer to a particulate material that has a particle size of about 10 nm up to about 1000 nm, including 10 nm to 1000 nm, about 10 nm up to about 50 nm and 10 nm to 50 nm.

Carbon Black

As discussed above, the reinforcing filler in the rubber compositions of the first-fourth embodiments disclosed herein may include (i.e., comprise) carbon black. As discussed above, in certain embodiments of the first-fourth embodiments disclosed herein the rubber composition comprises at least one reinforcing filler which comprises carbon black. As discussed in more detail below, most carbon blacks are commonly understood to be reinforcing fillers. In certain embodiments of the first-fourth embodiments disclosed herein, the rubber composition comprises at least one carbon black in an amount of from 0 to 100% by weight of the total amount of reinforcing filler, including 0 to about 95%, 0 to 95%, 0 to about 90%, 0 to 90%, 0 to about 85%, 0 to 85%, 0 to about 80%, 0 to 80%, 0 to about 75%, 0 to 75%, 0 to about 70%, 0 to 70%, 0 to about 65%, 0 to 65%, 0 to about 60%, 0 to 60%, 0 to about 55%, 0 to 55%, 0 to about 50%, 0 to 50%, 0 to about 45%, 0 to 45%, 0 to about 40%, 0 to 40%, 0 to about 35%, 0 to 35%, 0 to about 30%, 0 to 30%, 0 to about 25%, 0 to 25%, 0 to about 20%, 0 to 20%, about 5 to about 95%, 5 to 95%, about 5 to about 90%, 5 to 90%, about 5 to about 85%, 5 to 85%, about 5 to about 80%, 5 to 80%, about 5 to about 75%, 5 to 75%, about 5 to about 70%, 5 to 70%, about 5 to about 65%, 5 to 65%, about 5 to about 60%, 5 to 60%, about 5 to about 55%, 5 to 55%, about 5 to about 50%, 5 to 50%, about 5 to about 45%, 5 to 45%, about 5 to about 40%, 5 to 40%, about 5 to about 35%, 5 to 35%, about 5 to about 30%, 5 to 30%, about 5 to about 25%, 5 to 25%, about 5 to about 20%, 5 to 20%, about 10 to about 95%, 10 to 95%, about 10 to about 90%, 10 to 90%, about 10 to about 85%, 10 to 85%, about 10 to about 80%, 10 to 80%, about 10 to about 75%, 10 to 75%, about 10 to about 70%, 10 to 70%, about 10 to about 65%, 10 to 65%, about 10 to about 60%, 10 to 60%, about 10 to about 55%, 10 to 55%, about 10 to about 50%, 10 to 50%, about 10 to about 45%, 10 to 45%, about 10 to about 40%, 10 to 40%, about 10 to about 35%, 10 to 35%, about 10 to about 30%, 10 to 30%, about 10 to about 25%, 10 to 25%, about 10 to about 20%, 10 to 20%, about 15 to about 95%, 15 to 95%, about 15 to about 90%, 15 to 90%, about 15 to about 85%, 15 to 85%, about 15 to about 80%, 15 to 80%, about 15 to about 75%, 15 to 75%, about 15 to about 70%, 15 to 70%, about 15 to about 65%, 15 to 65%, about 15 to about 60%, 15 to 60%, about 15 to about 55%, 15 to 55%, about 15 to about 50%, 15 to 50%, about 15 to about 45%, 15 to 45%, about 15 to about 40%, 15 to 40%, about 15 to about 35%, 15 to 35%, about 15 to about 30%, 15 to 30%, about 15 to about 25%, 15 to 25%, about 15 to about 20%, 15 to 20%, about 20 to about 95%, 20 to 95%, about 20 to about 90%, 20 to 90%, about 20 to about 85%, 20 to 85%, about 20 to about 80%, 20 to 80%, about 20 to about 75%, 20 to 75%, about 20 to about 70%, 20 to 70%, about 20 to about 65%, 20 to 65%, about 20 to about 60%, 20 to 60%, about 20 to about 55%, 20 to 55%, about 20 to about 50%, 20 to 50%, about 20 to about 45%, 20 to 45%, about 20 to about 40%, 20 to 40%, about 20 to about 35%, 20 to 35%, about 20 to about 30%, 20 to 30%, about 20 to about 25%, 20 to 25%, about 25 to about 95%, 25 to 95%, about 25 to about 90%, 25 to 90%, about 25 to about 85%, 25 to 85%, about 25 to about 80%, 25 to 80%, about 25 to about 75%, 25 to 75%, about 25 to about 70%, 20 to 70%, about 25 to about 65%, 25 to 65%, about 25 to about 60%, 25 to 60%, about 25 to about 55%, 25 to 55%, about 25 to about 50%, 25 to 50%, about 25 to about 45%, 25 to 45%, about 25 to about 40%, 25 to 40%, about 25 to about 35%, 25 to 35%, about 25 to about 30%, 25 to 30%, about 30 to about 95%, 30 to 95%, about 30 to about 90%, 30 to 90%, about 30 to about 85%, 30 to 85%, about 30 to about 80%, 30 to 80%, about 30 to about 75%, 30 to 75%, about 30 to about 70%, 30 to 70%, about 30 to about 65%, 30 to 65%, about 30 to about 60%, 30 to 60%, about 30 to about 55%, 30 to 55%, about 30 to about 50%, 30 to 50%, about 30 to about 45%, 30 to 45%, about 30 to about 40%, 30 to 40%, about 30 to about 35%, 30 to 35%, about 35 to about 95%, 35 to 95%, about 35 to about 90%, 35 to 90%, about 35 to about 85%, 35 to 85%, about 35 to about 80%, 35 to 80%, about 35 to about 75%, 35 to 75%, about 35 to about 70%, 35 to 70%, about 35 to about 65%, 35 to 65%, about 35 to about 60%, 35 to 60%, about 35 to about 55%, 35 to 55%, about 35 to about 50%, 35 to 50%, about 35 to about 45%, 35 to 45%, about 35 to about 40%, 35 to 40%, about 40 to about 95%, 40 to 95%, about 40 to about 90%, 40 to 90%, about 40 to about 85%, 40 to 85%, about 40 to about 80%, 40 to 80%, about 40 to about 75%, 40 to 75%, about 40 to about 70%, 40 to 70%, about 40 to about 65%, 40 to 65%, about 40 to about 60%, 40 to 60%, about 40 to about 55%, 40 to 55%, about 40 to about 50%, 40 to 50%, about 40 to about 45%, 40 to 45%, about 45 to about 95%, 45 to 95%, about 45 to about 90%, 45 to 90%, about 45 to about 85%, 45 to 85%, about 45 to about 80%, 45 to 80%, about 45 to about 75%, 45 to 75%, about 45 to about 70%, 45 to 70%, about 45 to about 65%, 45 to 65%, about 45 to about 60%, 45 to 60%, about 45 to about 55%, 45 to 55%, about 45 to about 50%, 45 to 50%, about 50 to about 95%, 50 to 95%, about 50 to about 90%, 50 to 90%, about 50 to about 85%, 50 to 85%, about 50 to about 80%, 50 to 80%, about 50 to about 75%, 50 to 75%, about 50 to about 70%, 50 to 70%, about 50 to about 65%, 50 to 65%, about 50 to about 60%, 50 to 60%, about 50 to about 55%, 50 to 55%, about 55 to about 95%, 55 to 95%, about 55 to about 90%, 55 to 90%, about 55 to about 85%, 55 to 85%, about 55 to about 80%, 55 to 80%, about 55 to about 75%, 55 to 75%, about 55 to about 70%, 55 to 70%, about 55 to about 65%, 55 to 65%, about 55 to about 60%, 55 to 60%, about 60 to about 95%, 60 to 95%, about 60 to about 90%, 60 to 90%, about 60 to about 85%, 60 to 85%, about 60 to about 80%, 60 to 80%, about 60 to about 75%, 60 to 75%, about 60 to about 70%, 60 to 70%, about 60 to about 65%, 60 to 65%, about 65 to about 95%, 65 to 95%, about 65 to about 90%, 65 to 90%, about 65 to about 85%, 65 to 85%, about 65 to about 80%, 65 to 80%, about 65 to about 75%, 65 to 75%, about 65 to about 70%, 65 to 70%, about 70 to about 95%, 70 to 95%, about 70 to about 90%, 70 to 90%, about 70 to about 85%, 70 to 85%, about 70 to about 80%, 70 to 80%, about 70 to about 75%, 70 to 75%, about 75 to about 95%, 75 to 95%, about 75 to about 90%, 75 to 90%, about 75 to about 85%, 75 to 85%, about 75 to about 80%, 75 to 80%, about 80 to about 95%, 80 to 95%, about 80 to about 90%, 80 to 90%, about 80 to about 85%, 80 to 85%, about 85 to about 95%, 85 to 95%, about 85 to about 90%, 85 to 95%, about 90 to 95%, and 90 to 95% by weight. In certain particular embodiments, at least about 50%, including at least 50% of the reinforcing filler comprises at least one carbon black.

In certain embodiments of the first-fourth embodiments disclosed herein, the rubber composition comprises about 20 to about 200 phr (in total) of at least one reinforcing carbon black filler (e.g., 20 phr, 30 phr, 40 phr, 50 phr, 60 phr, 70 phr, 80 phr, 90 phr, 100 phr, 110 phr, 120 phr, 130 phr, 140 phr, 150 phr, 160 phr, 170 phr, 180 phr, and 190 phr), including 20 to 200 phr, about 20 to about 190 phr, 20 to 190 phr, about 20 to about 180 phr, 20 to 180 phr, about 20 to about 170 phr, 20 to 170 phr, about 20 to about 160 phr, 20 to 160 phr, about 20 to about 150 phr, 20 to 150 phr, about 30 to about 200 phr, 30 to 200 phr, about 30 to about 190 phr, 30 to 190 phr, about 30 to about 180 phr, 30 to 180 phr, about 30 to about 170 phr, 30 to 170 phr, about 30 to about 160 phr, 30 to 160 phr, about 30 to about 150 phr, 30 to 150 phr, about 40 to about 200 phr, 40 to 200 phr, about 40 to about 190 phr, 40 to 190 phr, about 40 to about 180 phr, 40 to 180 phr, about 40 to about 170 phr, 40 to 170 phr, about 40 to about 160 phr, 40 to 160 phr, about 40 to about 150 phr, 40 to 150 phr, about 50 to about 200 phr, 50 to 200 phr, about 50 to about 190 phr, 50 to 190 phr, about 50 to about 180 phr, 50 to 180 phr, about 50 to about 170 phr, 50 to 170 phr, about 50 to about 160 phr, 50 to 160 phr, about 50 to about 150 phr, 50 to 150 phr, about 60 to about 200 phr, 60 to 200 phr, about 60 to about 190 phr, 60 to 190 phr, about 60 to about 180 phr, 60 to 180 phr, about 60 to about 170 phr, 60 to 170 phr, about 60 to about 160 phr, 60 to 160 phr, about 60 to about 150 phr, 60 to 150 phr, about 70 to about 200 phr, 70 to 200 phr, about 70 to about 190 phr, 70 to 190 phr, about 70 to about 180 phr, 70 to 180 phr, about 70 to about 170 phr, 70 to 170 phr, about 70 to about 160 phr, 70 to 160 phr, about 70 to about 150 phr, 70 to 150 phr, about 80 to about 200 phr, 80 to 200 phr, about 80 to about 190 phr, 80 to 190 phr, about 80 to about 180 phr, 80 to 180 phr, about 80 to about 170 phr, 80 to 170 phr, about 80 to about 160 phr, 80 to 160 phr, about 80 to about 150 phr, 80 to 150 phr, about 90 to about 200 phr, 90 to 200 phr, about 90 to about 190 phr, 90 to 190 phr, about 90 to about 180 phr, 90 to 180 phr, about 90 to about 170 phr, 90 to 170 phr, about 90 to about 160 phr, 90 to 160 phr, about 90 to about 150 phr, 90 to 150 phr, about 100 to about 200 phr, 100 to 200 phr, about 100 to about 190 phr, 100 to 190 phr, about 100 to about 180 phr, 100 to 180 phr, about 100 to about 170 phr, 100 to 170 phr, about 100 to about 160 phr, 100 to 160 phr, about 100 to about 150 phr, and 100 to 150 phr of at least one reinforcing carbon black filler. In certain particular embodiments of the first-fourth embodiments disclosed herein, the rubber composition comprises at least about 70 to about 200 phr of at least one reinforcing carbon black filler, including 70 to 200 phr, about 70 to about 180 phr, 70 to 180 phr, about 70 to about 160 phr, and 70 to 160 phr.

Generally, suitable carbon black for use as a reinforcing filler in the rubber composition of certain embodiments of the first-fourth embodiments disclosed herein includes any of the commonly available, commercially-produced carbon blacks, including those having a surface area of at least about 20 $m^2$/g (including at least 20 $m^2$/g) and, more preferably, at least about 35 $m^2$/g up to about 200 $m^2$/g or higher (including 35 $m^2$/g up to 200 $m^2$/g). Surface area values used in this application for carbon blacks can be determined by ASTM D-1765 using the cetyltrimethylammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-fourth embodiments disclosed herein, the rubber composition includes a mixture of two or more of the foregoing blacks. Typical suitable carbon blacks for use in certain embodiments of the first-fourth embodiments disclosed herein are N-110, N-220, N-339, N-330, N-351, N-550, N-660, and combinations thereof, as designated by ASTM D-1765-82a. The carbon blacks utilized can be in pelletized form or an unpelletized flocculent mass. Preferably, for more uniform mixing, unpelletized carbon black is preferred.

Silica

As discussed above, the reinforcing filler in the rubber compositions of the first-fourth embodiments disclosed herein may include (i.e., comprise) silica. As discussed in more detail below, most silicas are commonly understood to be reinforcing fillers. Suitable reinforcing silica fillers for use in the rubber composition of certain embodiments of the first-fourth embodiments disclosed herein are well known. Non-limiting examples of reinforcing silica fillers suitable for use in the rubber compositions of certain embodiments of the first-fourth embodiments disclosed herein include, but are not limited to, precipitated amorphous silica, wet silica (hydrated silicic acid), dry silica (anhydrous silicic acid), fumed silica, calcium silicate and the like. Other suitable reinforcing silica fillers for use in rubber compositions of certain embodiments of the first-fourth embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first-fourth embodiments disclosed herein, the rubber composition comprises a reinforcing silica filler having a surface area (as measured by the BET method) of about 32 $m^2$/g to about 400 $m^2$/g (including 32 $m^2$/g to 400 $m^2$/g), with the range of about 100 $m^2$/g to about 300 $m^2$/g (including 100 $m^2$/g to 300 $m^2$/g) being preferred, and the range of about 150 $m^2$/g to about 220 $m^2$/g (including 150 $m^2$/g to 220 $m^2$/g) being included. In certain embodiments of the first-fourth embodiments disclosed herein, the rubber composition comprises reinforcing silica filler having a pH of about 5.5 to about 7 or slightly over 7, preferably about 5.5 to about 6.8. Some of the commercially available reinforcing silica fillers which can be used in the rubber compositions of certain embodiments of the first-fourth embodiments disclosed herein include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165 MP), and J. M. Huber Corporation.

In certain embodiments of the first-fourth embodiments disclosed herein, the reinforcing silica filler comprises a silica that has been pre-treated with a silica coupling agent; preferably the pre-treated silica comprises a silica that has been pre-treated with a silane-containing silica coupling agent.

In certain embodiments of the first-fourth embodiments disclosed herein, the rubber composition comprises at least one silica in an amount of from 0 to 100% by weight of the total amount of reinforcing filler, including 0 to about 95%, 0 to 95%, 0 to about 90%, 0 to 90%, 0 to about 85%, 0 to 85%, 0 to about 80%, 0 to 80%, 0 to about 75%, 0 to 75%, 0 to about 70%, 0 to 70%, 0 to about 65%, 0 to 65%, 0 to about 60%, 0 to 60%, 0 to about 55%, 0 to 55%, 0 to about 50%, 0 to 50%, 0 to about 45%, 0 to 45%, 0 to about 40%, 0 to 40%, 0 to about 35%, 0 to 35%, 0 to about 30%, 0 to 30%, 0 to about 25%, 0 to 25%, 0 to about 20%, 0 to 20%, about 5 to about 95%, 5 to 95%, about 5 to about 90%, 5 to 90%, about 5 to about 85%, 5 to 85%, about 5 to about 80%, 5 to 80%, about 5 to about 75%, 5 to 75%, about 5 to about 70%, 5 to 70%, about 5 to about 65%, 5 to 65%, about 5 to about 60%, 5 to 60%, about 5 to about 55%, 5 to 55%, about 5 to about 50%, 5 to 50%, about 5 to about 45%, 5 to 45%, about 5 to about 40%, 5 to 40%, about 5 to about 35%, 5 to 35%, about 5 to about 30%, 5 to 30%, about 5 to about 25%, 5 to 25%, about 5 to about 20%, 5 to 20%, about 10 to about 95%, 10 to 95%, about 10 to about 90%, 10 to 90%, about 10 to about 85%, 10 to 85%, about 10 to about 80%, 10 to 80%, about 10 to about 75%, 10 to 75%, about 10 to about 70%, 10 to 70%, about 10 to about 65%, 10 to 65%, about 10 to about 60%, 10 to 60%, about 10 to about 55%, 10 to 55%, about 10 to about 50%, 10 to 50%, about 10 to about 45%, 10 to 45%, about 10 to about 40%, 10 to 40%, about 10 to about 35%, 10 to 35%, about 10 to about 30%, 10 to 30%, about 10 to about 25%, 10 to 25%, about 10 to about 20%, 10 to 20%, about 15 to about 95%, 15 to 95%, about 15 to about 90%, 15 to 90%, about 15 to about 85%, 15 to 85%, about 15 to about 80%, 15 to 80%, about 15 to about 75%, 15 to 75%, about 15 to about 70%, 15 to 70%, about 15 to about 65%, 15 to 65%, about 15 to about 60%, 15 to 60%, about 15 to about 55%, 15 to 55%, about 15 to about 50%, 15 to 50%, about 15 to about 45%, 15 to 45%, about 15 to about 40%, 15 to 40%, about 15 to about 35%, 15 to 35%, about 15 to about 30%, 15 to 30%, about 15 to about 25%, 15 to 25%, about 15 to about 20%, 15 to 20%, about 20 to about 95%, 20 to 95%, about 20 to about 90%, 20 to 90%, about 20 to about 85%, 20 to 85%, about 20 to about 80%, 20 to 80%, about 20 to about 75%, 20 to 75%, about 20 to about 70%, 20 to 70%, about 20 to about 65%, 20 to 65%, about 20 to about 60%, 20 to 60%, about 20 to about 55%, 20 to 55%, about 20 to about 50%, 20 to 50%, about 20 to about 45%, 20 to 45%, about 20 to about 40%, 20 to 40%, about 20 to about 35%, 20 to 35%, about 20 to about 30%, 20 to 30%, about 20 to about 25%, 20 to 25%, about 25 to about 95%, 25 to 95%, about 25 to about 90%, 25 to 90%, about 25 to about 85%, 25 to 85%, about 25 to about 80%, 25 to 80%, about 25 to about 75%, 25 to 75%, about 25 to about 70%, 20 to 70%, about 25 to about 65%, 25 to 65%, about 25 to about 60%, 25 to 60%, about 25 to about 55%, 25 to 55%, about 25 to about 50%, 25 to 50%, about 25 to about 45%, 25 to 45%, about 25 to about 40%, 25 to 40%, about 25 to about 35%, 25 to 35%, about 25 to about 30%, 25 to 30%, about 30 to about 95%, 30 to 95%, about 30 to about 90%, 30 to 90%, about 30 to about 85%, 30 to 85%, about 30 to about 80%, 30 to 80%, about 30 to about 75%, 30 to 75%, about 30 to about 70%, 30 to 70%, about 30 to about 65%, 30 to 65%, about 30 to about 60%, 30 to 60%, about 30 to about 55%, 30 to 55%, about 30 to about 50%, 30 to 50%, about 30 to about 45%, 30 to 45%, about 30 to about 40%, 30 to 40%, about 30 to about 35%, 30 to 35%, about 35 to about 95%, 35 to 95%, about 35 to about 90%, 35 to 90%, about 35 to about 85%, 35 to 85%, about 35 to about 80%, 35 to 80%, about 35 to about 75%, 35 to 75%, about 35 to about 70%, 35 to 70%, about 35 to about 65%, 35 to 65%, about 35 to about 60%, 35 to 60%, about 35 to about 55%, 35 to 55%, about 35 to about 50%, 35 to 50%, about 35 to about 45%, 35 to 45%, about 35 to about 40%, 35 to 40%, about 40 to about 95%, 40 to 95%, about 40 to about 90%, 40 to 90%, about 40 to about 85%, 40 to 85%, about 40 to about 80%, 40 to 80%, about 40 to about 75%, 40 to 75%, about 40 to about 70%, 40 to 70%, about 40 to about 65%, 40 to 65%, about 40 to about 60%, 40 to 60%, about 40 to about 55%, 40 to 55%, about 40 to about 50%, 40 to 50%, about 40 to about 45%, 40 to 45%, about 45 to about 95%, 45 to 95%, about 45 to about 90%, 45 to 90%, about 45 to about 85%, 45 to 85%, about 45 to about 80%, 45 to 80%, about 45 to about 75%, 45 to 75%, about 45 to about 70%, 45 to 70%, about 45 to about 65%, 45 to 65%, about 45 to about 60%, 45 to 60%, about 45 to about 55%, 45 to 55%, about 45 to about 50%, 45 to 50%, about 50 to about 95%, 50 to 95%, about 50 to about 90%, 50 to 90%, about 50 to about 85%, 50 to 85%, about 50 to about 80%, 50 to 80%, about 50 to about 75%, 50 to 75%, about 50 to about 70%, 50 to 70%, about 50 to about 65%, 50 to 65%, about 50 to about 60%, 50 to 60%, about 50 to about 55%, 50 to 55%, about 55 to about 95%, 55 to 95%, about 55 to about 90%, 55 to 90%, about 55 to about 85%, 55 to 85%, about 55 to about 80%, 55 to 80%, about 55 to about 75%, 55 to 75%, about 55 to about 70%, 55 to 70%, about 55 to about 65%, 55 to 65%, about 55 to about 60%, 55 to 60%, about 60 to about 95%, 60 to 95%, about 60 to about 90%, 60 to 90%, about 60 to about 85%, 60 to 85%, about 60 to about 80%, 60 to 80%, about 60 to about 75%, 60 to 75%, about 60 to about 70%, 60 to 70%, about 60 to about 65%, 60 to 65%, about 65 to about 95%, 65 to 95%, about 65 to about 90%, 65 to 90%, about 65 to about 85%, 65 to 85%, about 65 to about 80%, 65 to 80%, about 65 to about 75%, 65 to 75%, about 65 to about 70%, 65 to 70%, about 70 to about 95%, 70 to 95%, about 70 to about 90%, 70 to 90%, about 70 to about 85%, 70 to 85%, about 70 to about 80%, 70 to 80%, about 70 to about 75%, 70 to 75%, about 75 to about 95%, 75 to 95%, about 75 to about 90%, 75 to 90%, about 75 to about 85%, 75 to 85%, about 75 to about 80%, 75 to 80%, about 80 to about 95%, 80 to 95%, about 80 to about 90%, 80 to 90%, about 80 to about 85%, 80 to 85%, about 85 to about 95%, 85 to 95%, about 85 to about 90%, 85 to 95%, about 90 to 95%, and 90 to 95% by weight. In certain particular embodiments, less than about 50%, including less than 50%, less than about 40%, less than 40%, less than about 30%, and less than 30% of the reinforcing filler comprises at least one silica.

In certain embodiments of the first-fourth embodiments disclosed herein, the rubber composition comprises about 10 to about 100 phr (in total) of at least one reinforcing silica filler (e.g., 10 phr, 20 phr, 30 phr, 40 phr, 50 phr, 60 phr, 70 phr, 80 phr, 90 phr), including 10 to 100 phr, about 10 to about 90 phr, 10 to 90 phr, about 10 to about 80 phr, 10 to 80 phr, about 10 to about 70 phr, 10 to 70 phr, about 10 to about 60 phr, 10 to 60 phr, about 10 to about 50 phr, 10 to 50 phr, about 10 to about 40 phr, 10 to 40 phr, about 10 to about 30 phr, 10 to 30 phr, about 10 to about 20 phr, 10 to 20 phr, about 20 to about 100 phr, 20 to 100 phr, about 20 to about 90 phr, 20 to 90 phr, about 20 to about 80 phr, 20 to 80 phr, about 20 to about 70 phr, 20 to 70 phr, about 20 to about 60 phr, 20 to 60 phr, about 20 to about 50 phr, 20 to 50 phr, about 20 to about 40 phr, 20 to 40 phr, about 20 to about 30 phr, 20 to 30 phr, about 30 to about 100 phr, 30 to 100 phr, about 30 to about 90 phr, 30 to 90 phr, about 30 to about 80 phr, 30 to 80 phr, about 30 to about 70 phr, 30 to 70 phr, about 30 to about 60 phr, 30 to 60 phr, about 30 to about 50 phr, 30 to 50 phr, about 30 to about 40 phr, 30 to 40 phr, about 40 to about 100 phr, 40 to 100 phr, about 40 to about 90 phr, 40 to 90 phr, about 40 to about 80 phr, 40 to 80 phr, about 40 to about 70 phr, 40 to 70 phr, about 40 to about 60 phr, 40 to 60 phr, about 40 to about 50 phr, 40 to 50 phr, about 50 to about 100 phr, 50 to 100 phr, about 50 to about 90 phr, 50 to 90 phr, about 50 to about 80 phr, 50 to 80 phr, about 50 to about 70 phr, 50 to 70 phr, about 50 to about 60 phr, 50 to 60 phr, about 60 to about 100 phr, 60 to 100 phr, about 60 to about 90 phr, 60 to 90 phr, about 60 to about 80 phr, 60 to 80 phr, about 60 to about 70 phr, 60 to 70 phr, about 70 to about 100 phr, 70 to 100 phr, about 70 to about 90 phr, 70 to 90 phr, about 70 to about 80 phr, 70 to 80 phr, about 80 to about 100 phr, 80 to 100 phr, about 80 to about 90 phr, 80 to 90 phr, about 90 to about 100 phr, and 90 to 100 phr. In certain particular embodiments of the first-fourth embodiments disclosed herein, the rubber composition comprises about 20 to about 100 phr silica, including 20 to 100 phr. In certain embodiments of the first-fourth embodiments disclosed herein, the rubber composition comprises less than 90 phr of silica.

In certain embodiments of the first-fourth embodiments disclosed herein, particularly those where the reinforcing filler includes silica, the rubber composition further comprises one or more silane coupling agents. Silane coupling agents are known to be particularly useful in preventing or reducing aggregation of the silica filler in the rubber composition. Aggregates of the silica filler particles are believed to increase the viscosity of the rubber composition, and, therefore, preventing this aggregation reduces the viscosity and improves the processability and blending of the rubber composition.

Generally, any conventional type of silane coupling agent can be used in the rubber compositions of the first-fourth embodiments disclosed herein, such as those having a silane and a constituent component or moiety that can react with an elastomer, particularly a vulcanizable polymer. The silane coupling agent acts as a connecting bridge between silica and the polymer. Suitable silane coupling agents for use in the rubber compositions of the first-fourth embodiments disclosed herein include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof.

Other Reinforcing Fillers

As discussed above, in certain embodiments of the first-fourth embodiments disclosed herein, the rubber composition comprises at least one reinforcing filler comprising a reinforcing filler other than carbon black or silica. In those embodiments of the first-fourth embodiments disclosed herein where the rubber composition comprises at least one reinforcing filler comprising silica, carbon black, or both, this reinforcing filler other than carbon black or silica may be referred to as an additional reinforcing filler. In certain embodiments of the first-fourth embodiments disclosed herein, the rubber composition comprises at least one of: carbon black or silica, and at least one additional reinforcing filler. In other words, in certain embodiments of the first-fourth embodiments disclosed herein, the rubber composition comprises at least reinforcing carbon black and at least one additional reinforcing filler; at least one reinforcing silica filler and at least one additional reinforcing filler; or at least one reinforcing carbon black, at least one reinforcing silica filler, and at least one additional reinforcing filler.

Suitable reinforcing fillers other than carbon black or silica for use in the rubber composition of certain embodiments of the first-fourth embodiments disclosed herein are well known. Non-limiting examples of suitable additional reinforcing fillers for use in the rubber compositions of certain embodiments of the first-fourth embodiments disclosed herein include, but are not limited to, alumina, aluminum hydroxide, clay (reinforcing grades), magnesium hydroxide, boron nitride, aluminum nitride, titanium dioxide, reinforcing zinc oxide, and combinations thereof.

Non-Reinforcing Fillers

In certain embodiments of the first-fourth embodiments disclosed herein, the rubber composition further comprises at least one non-reinforcing filler; the at least one non-reinforcing filler is optional. In other words, in certain embodiments of the first-fourth embodiments disclosed herein, the rubber composition comprises at least one non-reinforcing filler in addition to the at least one reinforcing filler. The term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. Additionally or alternatively, the term "non-reinforcing filler" is used to refer to a particulate material that has a particle size of greater than about 1000 nm (including greater than 1000 nm).

In certain embodiments of the first-fourth embodiments disclosed herein, the rubber composition further comprises at least one non-reinforcing filler in a total amount of about 5 to about 100 phr, including 5 to 100 phr.

Suitable non-reinforcing fillers for use in the rubber composition of certain embodiments of the first-fourth embodiments disclosed herein are well known. In certain embodiments of the first-fourth embodiments disclosed herein, the rubber composition further comprises at least one of the following non-reinforcing fillers: clay, graphite, talc, mica, titanium dioxide, magnesium dioxide, aluminum oxide, titanium oxide, calcium oxide, aluminum hydroxide, starch, boron nitride, silicon nitride, aluminum nitride, etc.), silicon carbide, aluminum carbonate ($Al_2(CO_3)_2$), non-reinforcing grades of calcium carbonate ($CaCO_3$), magnesium carbonate ($MgCO_3$), calcium oxide, mica, calcium oxide, boron nitride, silicon nitride, aluminum nitride, calcium silicate (or silicon carbide ($Ca_2SiO_4$, etc.), or crystalline aluminosilicates. In certain embodiments of the first-fourth embodiments disclosed herein, the rubber composition further comprises a non-reinforcing carbon black. Examples of suitable carbon blacks having a nitrogen surface area of no more than 20 $m^2/g$ include, but are not limited to, thermal blacks or the N9 series carbon blacks (also referred to as the N-900 series), such as those with the ASTM designation N-907, N-908, N-990, and N-991. Various carbon blacks meeting the forgoing are commercially available, including but not limited to Thermax® N990 carbon black from Cancarb Limited (Medicine Hat, Alberta, Canada).

In certain embodiments of the first-fourth embodiments disclosed herein, the rubber composition further comprises at least one inorganic filler (other than silica). Such an inorganic filler can be described as a non-silica inorganic filler. In other words, certain embodiments of the first-fourth embodiments disclosed herein, the rubber composition comprises at least one inorganic filler (other than silica) in addition to the at least one reinforcing filler. Inorganic fillers (other than silica) suitable for use in rubber compositions are well known. In certain embodiments of the first-fourth embodiments disclosed herein, the rubber composition comprises at one of the following inorganic fillers: aluminum hydroxide, talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), aluminum silicate ($Al_2SiO_5$, $Al_4.3SiO_4.5H_2O$ etc.), aluminum calcium silicate ($Al_2O_3.CaO_2SiO_2$, etc.), pyrofilite ($Al_2O_3.4SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), calcium silicate ($Ca_2SiO_4$ etc.), magnesium carbonate, magnesium hydroxide ($MH(OH)_2$), magnesium oxide (MgO), magnesium carbonate ($MgCO_3$), magnesium silicate ($Mg_2SiO_4$, $MgSiO_3$ etc.), magnesium calcium silicate ($CaMgSiO_4$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof. In certain embodiments of the first-fourth embodiments disclosed herein, the rubber composition comprises at least one reinforcing filler (as discussed above) and at least one of the following inorganic fillers: aluminum hydroxide, talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), aluminum silicate ($Al_2SiO_5$, $Al_4.3SiO_4.5H_2O$ etc.), aluminum calcium silicate ($Al_2O_3.CaO_2SiO_2$, etc.), pyrofilite ($Al_2O_3.4SiO_2.H_2O$), bentonite ($Al_2O_3.4SiO_2.2H_2O$), boron nitride, mica, kaolin, glass balloon, glass beads, calcium oxide (CaO), calcium hydroxide (Ca(OH)$_2$), calcium carbonate (CaCO$_3$), calcium silicate (Ca$_2$SiO$_4$ etc.), magnesium carbonate, magnesium hydroxide (MH(OH)$_2$), magnesium oxide (MgO), magnesium carbonate (MgCO$_3$), magnesium silicate (Mg$_2$SiO$_4$, MgSiO$_3$ etc.), magnesium calcium silicate (CaMgSiO$_4$), titanium oxide, titanium dioxide, potassium titanate, barium sulfate, zirconium oxide (ZrO$_2$), zirconium hydroxide [Zr(OH)$_2$.nH$_2$O], zirconium carbonate [Zr(CO$_3$)$_2$], crystalline aluminosilicates, reinforcing grades of zinc oxide (i.e., reinforcing zinc oxide), and combinations thereof.

Hydrocarbon Resin

As discussed above, according to the first-fourth embodiments disclosed herein, the rubber composition comprises about 5 to about 70 phr (including 5 to 70 phr) of at least one hydrocarbon resin (e.g., 5 phr, 10 phr, 15 phr, 20 phr, 25 phr, 30 phr, 35 phr, 40 phr, 45 phr, 50 phr, 55 phr, 60 phr, 65 phr, 70 phr). When the rubber composition is incorporated into a race tire tread, the hydrocarbon resin functions to enhance the grip of the tire on the track surface. As used herein the term "resin" is intended to encompass compounds which are solid (or semi-solid) at room temperature (23° C.) as well as those that are liquid (usually viscous liquid) at room temperature. In certain embodiments of the first-fourth embodiments, the resin includes materials identified by their manufacturer as a resin (e.g., in product literature or advertising). Various types of hydrocarbon resins are well known to those of skill in the art including, but not limited to coumarone-indene resins, petroleum resins, terpene resins, asphalts, bitumens, tars, and copolymers. More specific exemplary types of hydrocarbon resins include, but are not limited to, coumarone-indene resin; cyclopentadiene or dicyclopentadiene homopolymer or copolymer resins; terpene resins based on alpha- or beta-pinene; terpene/phenol homopolymer or copolymer resins; C5 or C9 fraction homopolymer or copolymer resins; alpha-methylstyrene homopolymer or copolymer resins; and combinations thereof. In certain embodiments of the first-fourth embodiments disclosed herein, the at least one hydrocarbon resin comprises at least one of: a coumarone-indene resin, a petroleum resin, a terpene resin, a bitumen, an asphalt, a tar, or a copolymer resin. One or more than one type may be utilized or more than one of one or more types may be utilized to comprise the about 5 to about 70 phr of hydrocarbon resin.

In certain embodiments of the first-fourth embodiments disclosed herein, the at least one hydrocarbon resin is present in an amount of about 10 to about 60 phr, including 10 to 60 phr, about 10 to about 50 phr, 10 to 50 phr, about 10 to about 40 phr, 10 to 40 phr, about 10 to about 30 phr, 10 to 30 phr, about 10 to about 20 phr, 10 to 20 phr, about 20 to about 60 phr, 20 to 60 phr, about 20 to about 50 phr, including 20 to 50 phr, about 20 to about 40 phr, 20 to 40 phr, about 20 to about 30 phr, 20 to 30 phr, about 30 to about 60 phr, 30 to 60 phr, about 30 to about 50 phr, including 30 to 50 phr, about 30 to about 40 phr, 30 to 40 phr, about 40 to about 60 phr, 40 to 60 phr, about 40 to about 50 phr, and 40 to 50 phr.

Oil(s): Plant Oil and Additional Oil

As discussed above, according to the first-fourth embodiments disclosed herein, the rubber composition comprises about 25 to about 100 phr of at least one plant oil and optionally at least one additional oil, wherein the total amount of oil in the rubber composition is at least 60 phr and comprises about 15 to about 35% by weight of the rubber composition. The optional at least one additional oil may comprise free or processing oil which is added to the rubber composition during one or more mixing stages, extender oil present in one or more elastomers (i.e., oil-extended elastomer), or a combination of both. The optional at least one additional oil may comprise at least one plant oil, at least one non-plant oil, or a combination thereof. Exemplary plant oils and non-plant oils are discussed in more detail below. In certain embodiments of the first-fourth embodiments disclosed herein, the rubber composition includes (comprises) at least one additional oil in an amount of at least about 25 phr, including at least 25 phr, at least about 30 phr, at least 30 phr, at least about 35 phr, at least 35 phr, at least about 40 phr, at least 40 phr, at least about 45 phr, at least 45 phr, at least about 50 phr, at least 50 phr, at least about 55 phr, at least 55 phr, at least about 60 phr, at least 60 phr, at least about 65 phr, at least 65 phr, at least about 70 phr, and at least 70 phr; in certain of the foregoing embodiments, the total amount of the at least one additional oil comprises no more than about 100 phr, including no more than 100 phr, no more than about 90 phr, no more than 90 phr, no more than about 80 phr, and no more than 80 phr.

As discussed above, the total amount of oil in the rubber compositions of the first-fourth embodiments is not only at least 60 phr but the oil also comprises about 15 to about 35% by weight (including 15 to 35% by weight) of the rubber composition. The percentage by weight of the oil is determined by dividing the total amount of oil (e.g., the at least one plant oil plus any additional oil) by the weight of all ingredients contained within the rubber composition. As a non-limiting example, if 75 phr of plant oil and 25 phr of additional oil in the form of low PCA were utilized and the total weight of all ingredients contained within the rubber composition were 300 phr (or parts), the oil would be present in an amount of about 33% by weight of the rubber composition. In certain embodiments of the first-fourth embodiments disclosed herein, the total amount of oil comprises about 15 to about 30% by weight, 15 to 30% by weight, about 15 to about 25% by weight, 15 to 25% by weight, about 20 to about 35% by weight, 20 to 35% by weight, about 20 to about 30% by weight, or 20 to 30% by weight of the rubber composition.

In certain embodiments of the first-fourth embodiments disclosed herein the total amount of oil in the rubber composition is about 60 phr to about 200 phr, including 60 phr to 200 phr, about 60 phr to about 190 phr, 60 phr to 190 phr, about 60 phr to about 180 phr, 60 phr to 180 phr, about 60 phr to about 170 phr, 60 phr to 170 phr, about 60 phr to about 160 phr, 60 phr to 160 phr, about 60 phr to about 150 phr, 60 phr to 150 phr, about 60 phr to about 140 phr, 60 phr to 140 phr, about 60 phr to about 130 phr, 60 phr to 130 phr, about 60 phr to about 120 phr, 60 phr to 120 phr, about 60 phr to about 110 phr, 60 phr to 110 phr, about 60 phr to about 100 phr, 60 phr to 100 phr, about 70 phr to about 200 phr, including 70 phr to 200 phr, about 70 phr to about 190 phr, 70 phr to 190 phr, about 70 phr to about 180 phr, 70 phr to 180 phr, about 70 phr to about 170 phr, 70 phr to 170 phr, about 70 phr to about 160 phr, 70 phr to 160 phr, about 70 phr to about 150 phr, 70 phr to 150 phr, about 70 phr to about 140 phr, 70 phr to 140 phr, about 70 phr to about 130 phr, 70 phr to 130 phr, about 70 phr to about 120 phr, 70 phr to 120 phr, about 70 phr to about 110 phr, 70 phr to 110 phr, about 70 phr to about 100 phr, 70 phr to 100 phr, about 80 phr to about 200 phr, including 80 phr to 200 phr, about 80 phr to about 190 phr, 80 phr to 190 phr, about 80 phr to about 180 phr, 80 phr to 180 phr, about 80 phr to about 170 phr, 80 phr to 170 phr, about 80 phr to about 160 phr, 80 phr to 160 phr, about 80 phr to about 150 phr, 80 phr to 150 phr, about 80 phr to about 140 phr, 80 phr to 140 phr, about 80 phr to about 130 phr, 80 phr to 130 phr, about 80 phr to about 120 phr, 80 phr to 120 phr, about 80 phr to about 110 phr, 80 phr to 110 phr, about 80 phr to about 100 phr, 80 phr to 100 phr, about 90 phr to about 200 phr, including 90 phr to 200 phr, about 90 phr to about 190 phr, 90 phr to 190 phr, about 90 phr to about 180 phr, 90 phr to 180 phr, about 90 phr to about 170 phr, 90 phr to 170 phr, about 90 phr to about 160 phr, 90 phr to 160 phr, about 90 phr to about 150 phr, 90 phr to 150 phr, about 90 phr to about 140 phr, 90 phr to 140 phr, about 90 phr to about 130 phr, 90 phr to 130 phr, about 90 phr to about 120 phr, 90 phr to 120 phr, about 90 phr to about 110 phr, 90 phr to 110 phr, about 90 phr to about 100 phr, 90 phr to 100 phr, about 100 phr to about 200 phr, including 100 phr to 200 phr, about 100 phr to about 190 phr, 100 phr to 190 phr, about 100 phr to about 180 phr, 100 phr to 180 phr, about 100 phr to about 170 phr, 100 phr to 170 phr, about 100 phr to about 160 phr, 100 phr to 160 phr, about 100 phr to about 150 phr, 100 phr to 150 phr, about 100 phr to about 140 phr, 100 phr to 140 phr, about 100 phr to about 130 phr, 100 phr to 130 phr, about 100 phr to about 120 phr, 100 phr to 120 phr, about 100 phr to about 110 phr, 100 phr to 110 phr, about 110 phr to about 200 phr, including 110 phr to 200 phr, about 110 phr to about 190 phr, 110 phr to 190 phr, about 110 phr to about 180 phr, 110 phr to 180 phr, about 110 phr to about 170 phr, 110 phr to 170 phr, about 110 phr to about 160 phr, 110 phr to 160 phr, about 110 phr to about 150 phr, 110 phr to 150 phr, about 110 phr to about 140 phr, 110 phr to 140 phr, about 110 phr to about 130 phr, 110 phr to 130 phr, about 110 phr to about 120 phr, 110 phr to 120 phr, about 120 phr to about 200 phr, including 120 phr to 200 phr, about 120 phr to about 190 phr, 120 phr to 190 phr, about 120 phr to about 180 phr, 120 phr to 180 phr, about 120 phr to about 170 phr, 120 phr to 170 phr, about 120 phr to about 160 phr, 120 phr to 160 phr, about 120 phr to about 150 phr, 120 phr to 150 phr, about 120 phr to about 140 phr, 120 phr to 140 phr, about 120 phr to about 130 phr, or 120 phr to 130 phr. In certain embodiments of the first-fourth embodiments, the total amount of oil in the rubber composition is at least about 100 phr or at least 100 phr.

In certain embodiments of the first-fourth embodiments disclosed herein, the rubber compositions comprise a majority (by weight) of the at least one elastomer in the form of at least one oil-extended elastomer; in certain such embodiments, the oil-extended elastomer comprises a synthetic elastomer. By stating that a majority by weight of the at least one elastomer of the rubber composition comprises at least one oil-extended elastomer is meant that more than 50 parts of the 100 parts of at least one elastomer comprises at least one oil-extended elastomer. The amount of oil present in the at least one oil-extended elastomer may vary. In certain embodiments of the first-fourth embodiments disclosed herein, the oil-extended elastomer comprises 25-60% by weight of at least one oil (based upon the weight of the oil-extended elastomer; in certain such embodiments, the oil-extended elastomer comprises 30-60%, 30-55%, 30-50%, 30-45%, 30-40%, 35-60%, 35-55%, 35-50%, 35-45%, 35-40%, 40-60%, 40-55%, 40-50%, 40-45%, 45-60%, 45-55%, 45-50%, 50-60%, or 50-55% by weight of the oil-extended elastomer. In certain embodiments of the first-fourth embodiments disclosed herein, the at least one elastomer comprises a majority of at least one oil-extended synthetic elastomer and the at least one oil-extended synthetic elastomer comprises 25-60% by weight oil (based upon the weight of the oil-extended synthetic elastomer).

Various types of oils may be utilized for the at least one plant oil and for the at least one additional oil (when the at least one additional oil is present). In certain embodiments of the first-fourth embodiments disclosed herein, the at least one plant oil comprises oil sourced from plant sources such as vegetables, nuts (as used herein nuts include drupes), and seeds; in certain such embodiments the at least one plant oil comprises one or more nut oils. In certain embodiments of the first-fourth embodiments disclosed herein, the at least one plant oil comprises a palm plant oil. Palm plant oils include coconut oil (extracted from the fleshy part of the coconut drupe), palm oil (extracted from the fleshy part of the palm drupe), and palm kernel oil (extracted from the kernel of the palm drupe). In certain embodiments of the first-fourth embodiments disclosed herein, the at least one plant oil comprises coconut oil. In certain embodiments of the first-fourth embodiments disclosed herein, the at least one plant oil is coconut oil and excludes any other plant oil (i.e., contains 0 phr of any other plant oil). In certain embodiments of the first-fourth embodiments disclosed herein, the at least one plant oil or the coconut oil is unmodified (e.g., is not hydrogenated or hydrogenated).

The oils extracted from palm plants (e.g., coconut oil, palm oil, and palm kernel oil) all have relatively high amounts of saturated fatty acids, generally 50% or more by weight of the fatty acid content of the oils extracted from palm plants is saturated, with coconut oil and palm kernel oil generally having 80% or more by weight saturated oil. Coconut oil can have 90% or more by weight of its fatty acid content in the form of saturated fatty acids. In certain embodiments of the first-fourth embodiments disclosed herein, the at least one plant oil has a saturated fatty acid content of greater than 50%, greater than 80% or greater than 90%. Palm plant oils generally have a relatively low iodine value, e.g., less than about 55, less than 55, or even less than about 50 or less than 50, with coconut oil having an iodine value of less than about 20, less than 20, or even less than about 15 or less than 15. Iodine values can be measured according to ASTM D5768-02. In certain embodiments of the first-fourth embodiments disclosed herein, the at least one plant oil has an iodine value of less than about 55, less than 55, less than about 50, less than 50, less than about 20, less than 20, less than about 15, or less than 15 (according to ASTM D5768-02).

In certain embodiments of the first-fourth embodiments disclosed herein, the at least one additional oil of the rubber composition (when present) comprises at least one of an aromatic, a naphthenic, or a low PCA oil. One or more than one type of oil or more than one oil from one or more types may be utilized. Aromatic oils are not plant oils but instead are usually obtained from petroleum sources. Similarly, naphthenic oils are also not plant oils but instead are usually obtained from petroleum sources. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXON MOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples of suitable oils for use as the at least one additional oil include, but are not limited to, soy or soybean oil, sunflower oil (including high oleic sunflower oil), safflower oil, corn oil, linseed oil, cotton seed oil, rapeseed oil, cashew oil, sesame oil, *camellia* oil, jojoba oil, macadamia nut oil, coconut oil, and palm oil. When utilized for the at least one additional oil, one or more of the foregoing processing oils can also (or alternatively) be used as an extender oil, i.e., to prepare an oil-extended polymer or copolymer or as a processing or free oil.

In certain embodiments of the first-fourth embodiments disclosed herein, the rubber composition contains less than 5 phr, less than 3 phr, less than 1 phr, or 0 phr of MES or TDEA oil.

Other Ingredients

Other ingredients that may be employed (i.e., are optional) in the rubber compositions of certain embodiments of the first-fourth embodiments are well known to those of skill in the art and include waxes, processing aids, antioxidants, other resins (e.g., tackifying resins in addition to the hydrocarbon resins discussed above, reinforcing resins), peptizers, and a cure package.

Various types of tackifying resins (in addition to the hydrocarbon resins discussed above) are known to those of skill in the art and may be utilized in the rubber compositions of certain embodiments of the first-fourth embodiments; these include but not limited to: rosin and its derivatives, and phenol-formaldehyde resins. One or more than one type as well as one or more than one of each type may be utilized in certain embodiments of the first and second embodiments. Exemplary types of rosin-type resins include, but are not limited to, gum rosin, wood rosin, tall oil rosin, rosin esters, and combinations thereof. Exemplary types of phenol-formaldehyde resins include, but are not limited to, those containing alkyl phenols. In certain embodiments of the first and second embodiments, the amount of any addition resin utilized (i.e., in addition to the hydrocarbon resin discussed above) is about 1 to about 25 phr, including 1 to 25 phr, about 5 to about 25 phr, 5 to 25 phr, about 5 to about 20 phr, 5 to 20 phr, about 5 to about 15 phr, and 5 to 15 phr.

Various antioxidants are known to those of skill in the art and may be utilized in the rubber compositions of certain embodiments of the first-fourth embodiments; these include but are not limited to phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as—one or more than one of each type may be utilized in certain embodiments of the first-fourth embodiments. In certain embodiments of the first and second embodiments, the total amount of antioxidant(s) used is 0.1 to 6 phr.

In certain embodiments of the first-fourth embodiments disclosed herein, the rubber composition comprises a cure package. Generally, the cure package includes at least one of: a vulcanizing agent; a vulcanizing accelerator; a vulcanizing activator (e.g., zinc oxide, stearic acid, and the like); a vulcanizing inhibitor; and an anti-scorching agent. In certain embodiments, the cure package includes at least one vulcanizing agent, at least one vulcanizing accelerator, at least one vulcanizing activator, and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first-fourth embodiments disclosed herein, include but are not limited to, sulfur or peroxide-based curing components. Thus, in certain such embodiments, the cure package includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first-fourth embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the total amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 10 phr, preferably 0.5 to 8 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Methods for Preparing the Rubber Compositions

The rubber compositions according to the first-fourth embodiments disclosed herein can be prepared by conventional processes. According to such conventional processes, the particular steps involved comprise mixing the ingredients in at least one non-productive master-batch stage and a final productive mixing stage. In certain embodiments of the first-fourth embodiments disclosed herein, the rubber composition is prepared by combining the ingredients for the rubber composition (as disclosed above) by methods known in the art, such as, for example, by kneading the ingredients together in a Banbury mixer or on a milled roll. Such methods generally include at least one non-productive master-batch mixing stage and a final productive mixing stage. The term non-productive master-batch stage is known to those of skill in the art and generally understood to be a mixing stage (or stages) where no vulcanizing agents or vulcanization accelerators are added. The term final productive mixing stage is also known to those of skill in the art and generally understood to be the mixing stage where the vulcanizing agents and vulcanization accelerators are added into the rubber composition.

Generally, the at least one elastomer, reinforcing filler, hydrocarbon resin, and plant oil will be added in a non-productive or master-batch mixing stage or stages. When ingredients of a cure package are utilized, generally at least the vulcanizing agent component and the vulcanizing accelerator component will be added in a final or productive mixing stage.

In certain embodiments of the first-fourth embodiments disclosed herein, the rubber composition is prepared using at least one non-productive master batch mixing stage(s) conducted at a temperature of about 130° C. to about 200° C. In certain embodiments of the first-fourth embodiments disclosed herein, the rubber composition is prepared using a final productive mixing stage conducted at a temperature below the vulcanization temperature in order to avoid unwanted pre-cure of the rubber composition. Therefore, the temperature of the productive or final mixing stage should not exceed about 120° C. and is typically about 40° C. to about 120° C., or about 60° C. to about 110° C. and, especially, about 75° C. to about 100° C. In certain embodiments of the first-fourth embodiments disclosed herein, the rubber composition is prepared according to a method that includes at least one non-productive mixing stage and at least one productive mixing stage. Where a rubber composition of the first-fourth embodiments includes fillers other than (or in addition to) carbon black, a separate re-mill stage may be employed for separate addition of a portion or all of the other fillers. This stage often is performed at temperatures similar to, although often slightly lower than, those employed in the masterbatch stage, i.e., ramping from about 90° C. to a drop temperature of about 150° C.

Properties of the Rubber Composition

In certain embodiments of the first-fourth embodiments disclosed herein, the rubber composition has certain mechanical properties. More specifically, in certain embodiments of the first-fourth embodiments disclosed herein, the rubber composition meets at least one of the following: (a) has a durometer reading of about 20 to about 65 at 100° C. (including 20 to 65 at 100° C.); (b) has a durometer reading at room temperature of about 40 to about 70 (including 40 to 70); (c) has an elongation at break of about 400 to about 900% (including 400 to 900%) at room temperature; (d) has a 100% modulus at room temperature of no more than about 300 (including no more than 300); (e) has a tan δ at 35° C. of about 0.2 to about 0.8 (including 0.2 to 0.8); (f) has a tan δ at 100° C. of about 0.1 to about 0.6 (including 0.1 to 0.6); (g) has an E' at 35° C. of about 2.5 to about 10 (including 2.5 to 10); or (h) has an E' at 100° C. of about 1.1 to about 6. The values for durometer, elongation at break, 100% modulus, tan δ, and E' can be measured in accordance with the testing methods discussed in the Examples section below. In certain embodiments of the first-fourth embodiments disclosed herein, at least (a) is met. In certain embodiments of the first-fourth embodiments disclosed herein, at least (b) is met. In certain embodiments of the first-fourth embodiments disclosed herein, at least (c) is met. In certain embodiments of the first-fourth embodiments disclosed herein, at least (d) is met. In certain embodiments of the first-fourth embodiments disclosed herein, at least (e) is met. In certain embodiments of the first-fourth embodiments disclosed herein, at least (f) is met. In certain embodiments of the first-fourth embodiments disclosed herein, at least (g) is met. In certain embodiments of the first-fourth embodiments disclosed herein, at least (h) is met. In certain embodiments, the value of at least one of (a)-(h) is comparable to the respective value for a comparative rubber composition having the same formula except for replacing the plant oil (e.g., coconut oil) with an equivalent amount of low PCA oil. As used herein the term "comparable" means within 90% of the control value (i.e., no more than 10% higher or lower than the control value, and in certain embodiments no more than 5% higher or lower than the control value).

In certain embodiments of the first-fourth embodiments disclosed herein, the rubber composition has a value for (a), i.e., durometer reading at 100° C. of about 25 to about 65, 25 to 65, about 25 to about 60, 25 to 60, about 25 to about 55, 25 to 55, about 25 to about 50, 25 to 50, about 25 to about 45, 25 to 45, about 25 to about 40, 25 to 40, about 30 to about 65, 30 to 65, about 30 to about 60, 30 to 60, about 30 to about 55, 30 to 55, about 30 to about 50, 30 to 50, about 30 to about 45, 30 to 45, about 30 to about 40, or 30 to 40. In certain embodiments of the first-fourth embodiments disclosed herein, the rubber composition has a value for (b), i.e., durometer reading at room temperature of about 40 to about 65, 40 to 65, about 40 to about 60, 40 to 60, about 40 to about 55, 40 to 55, about 40 to about 50, 40 to 50, about 45 to about 70, 40 to 70, about 45 to about 65, 45 to 65, about 45 to about 60, 45 to 60, about 45 to about 55, 45 to 55, about 45 to about 50, 45 to 50, about 50 to about 70, 50 to 70, about 50 to about 65, 50 to 65, about 50 to about 60, 50 to 60, about 50 to about 55, or 50 to 55. In certain embodiments of the first-fourth embodiments disclosed herein, the rubber composition has a value for (c), i.e., an elongation at break at room temperature of about 450 to about 900%, 450 to 900%, about 450 to about 850%, 450 to 850%, about 450 to about 800%, 450 to 800%, about 500 to about 900%, 500 to 900%, about 500 to about 850%, 500 to 850%, about 500 to about 800%, 500 to 800%, about 550 to about 900%, 550 to 900%, about 550 to about 850%, 550 to 850%, about 550 to about 800%, 550 to 800%, about 600 to about 900%, 600 to 900%, about 600 to about 850%, 600 to 850%, about 600 to about 800%, or 600 to 800%. In certain embodiments of the first-fourth embodiments disclosed herein, the rubber composition has a value for (d), i.e., a 100% modulus at room temperature of no more than about 250, no more than 250, no more than about 200, no more than 200, no more than about 150, no more than 150, no more than about 100, no more than 100, about 50 to about 300, 50 to 300, about 100 to about 300, or 100 to 300. In certain embodiments of the first-fourth embodiments disclosed herein, the rubber composition has a value for (e), i.e., a tan δ at 35° C. of about 0.25 to about 0.8, 0.25 to 0.8, about 0.25 to about 0.75, 0.25 to 0.75, about 0.25 to about 0.7, 0.25 to 0.7, about 0.25 to about 0.65, 0.25 to 0.65, about 0.25 to about 0.6, 0.25 to 0.6, about 0.3 to about 0.8, 0.3 to 0.8, about 0.3 to about 0.75, 0.3 to 0.75, about 0.3 to about 0.7, 0.3 to 0.7, about 0.3 to about 0.65, 0.3 to 0.65, about 0.3 to about 0.6, 0.3 to 0.6, about 0.35 to about 0.8, 0.35 to 0.8, about 0.35 to about 0.75, 0.35 to 0.75, about 0.35 to about 0.7, 0.35 to 0.7, about 0.35 to about 0.65, 0.35 to 0.65, about 0.35 to about 0.6, 0.35 to 0.6, about 0.4 to about 0.8, 0.4 to 0.8, about 0.4 to about 0.75, 0.4 to 0.75, about 0.4 to about 0.7, 0.4 to 0.7, about 0.4 to about 0.65, 0.4 to 0.65, about 0.4 to about 0.60, or 0.4 to 0.6. In certain embodiments of the first-fourth embodiments disclosed herein, the rubber composition has a value for (f), i.e., a tan δ at 100° C. of about 0.15 to about 0.6, 0.15 to 0.6, about 0.15 to about 0.55, 0.15 to 0.55, about 0.15 to about 0.5, 0.15 to 0.5, about 0.15 to about 0.45, 0.15 to 0.45, about 0.15 to about 0.4, 0.15 to 0.4, about 0.2 to about 0.6, 0.2 to 0.6, about 0.2 to about 0.55, 0.2 to 0.55, about 0.2 to about 0.5, 0.2 to 0.5, about 0.2 to about 0.45, 0.2 to 0.45, about 0.2 to about 0.4, 0.2 to 0.4, about 0.25 to about 0.6, 0.25 to 0.6, 0.25 to about 0.55, 0.25 to 0.55, about 0.25 to about 0.5, 0.25 to 0, about 0.25 to about 0.45, 0.25 to 0.45, about 0.25 to about 0.4, 0.25 to 0.4, about 0.3 to about 0.6, 0.3 to 0.6, about 0.3 to about 0.55, 0.3 to 0.55, about 0.3 to about 0.5, 0.3 to 0.5, about 0.3 to about 0.45, 0.3 to 0.45, about 0.3 to about 0.4, or 0.3 to 0.4. In certain embodiments of the first-fourth embodiments disclosed herein, the rubber composition has a value for (g), i.e., E' at 35° C. of about 2.5 to about 9, 2.5 to 9, about 2.5 to about 8, 2.5 to 8, about 2.5 to about 7, 2.5 to 7, about 2.5 to about 6, 2.5 to 6, about 2.5 to about 5, 2.5 to 5, about 3 to about 9, 3 to 9, about 3 to about 8, 3 to 8, about 3 to about 7, 3 to 7, about 3 to about 6, 3 to 6, about 3 to about 5, 3 to 5, about 3.5 to about 9, 3.5 to 9, about 3.5 to about 8, 3.5 to 8, about 3.5 to about 7, 3.5 to 7, about 3.5 to about 6, 3.5 to 6, about 3.5 to about 5, 3.5 to 5, about 4 to about 9, 4 to 9, about 4 to about 8, 4 to 8, about 4 to about 7, 4 to 7, about 4 to about 6, 4 to 6, about 4 to about 5, or 4 to 5. In certain embodiments of the first-fourth embodiments disclosed herein, the rubber composition has a value for (h), i.e., E' at 100° C. of about 1.5 to about 6, 1.5 to 6, about 1.5 to about 5.5, 1.5 to 5.5, about 1.5 to about 5, 1.5 to 5, about 1.5 to about 4.5, 1.5 to 4.5, about 1.5 to about 4, 1.5 to 4, about 1.5 to about 3.5, 1.5 to 3.5, about 1.5 to about 3, 1.5 to 3, about 2 to about 6, 2 to 6, about 2 to about 5.5, 2 to 5.5, about 2 to about 5, 2 to 5, about 2 to about 4.5, 2 to 4.5, about 2 to about 4, 2 to 4, about 2 to about 3.5, 2 to 3.5, about 2 to about 3, 2 to 3, about 2.5 to about 6, 2.5 to 6, about 2.5 to about 5.5, 2.5 to 5.5, about 2.5 to about 5, 2.5 to 5, about 2.5 to about 4.5, 2.5 to 4.5, about 2.5 to about 4, 2.5 to 4, about 2.5 to about 3.5, 2.5 to 3.5, about 2.5 to about 3, or 2.5 to 3.

Tire Components and Tires

As discussed above, the rubber composition of the first embodiment may be utilized in a tire tread, particularly a race tire tread. The second embodiment disclosed herein is directed to a race tire tread comprising the rubber composition of the first embodiment. The third embodiment disclosed herein is directed to a race tire having a tread comprising the rubber composition of the first embodiment.

The road-contacting surface of a race tire tread may vary depending upon various conditions including the track surface and the running conditions (e.g., ambient and/or track temperature, ambient and/or track moisture, speed, and desired or intended mileage). In certain embodiments of the first-fourth embodiments disclosed herein, the road-contacting surface of a race tire tread made from the rubber composition of the first embodiment is slick. In other embodiments of the first-fourth embodiments disclosed herein, the road-contacting surface of a race tire tread made from the rubber composition of the first embodiment is patterned (i.e., non-slick).

Cars

As discussed above, the fourth embodiment disclosed herein is directed to a car having at least one wheel mounted with a race tire according to the third embodiment (i.e., a race tire having a tread comprising the rubber composition according to the first embodiment disclosed herein). In certain of the foregoing embodiments, two wheels or all four wheels of the care are mounted with a race tire according to the third embodiment (i.e., a race tire having a tread comprising the rubber composition according to the first embodiment disclosed herein).

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that the plant oil (i.e., coconut oil) utilized in the examples can be utilized in different amounts and with elastomers, additional oils, fillers, and other ingredients which differ in amount, composition, or both from those used in the examples (i.e., as fully as disclosed in the preceding paragraphs).

Examples 1 and 2

In Examples 1 and 2, rubber compositions were prepared using the ingredients specified in Table 1. Example 1 is a control or comparative examples which lacks any plant oil (i.e., contains no coconut oil). The amount of each ingredient (other than the elastomer which is present in 100 parts) used is listed in Table 1 in parts per hundred rubber (phr). The rubber compositions were prepared in a two stage mixing process (i.e., one master-batch/non-productive stage, followed by a final batch stage) according to the conditions shown in Table 2.

TABLE 1

| Ingredients (in phr) | Ex. 1 | Ex. 2 |
|---|---|---|
| Master-Batch | | |
| Styrene-butadiene rubber[1] | 137.5 | 137.5 |
| Carbon Black[2] | 75 | 75 |
| Processing oil (low PCA oil) | 25 | 0 |
| Coconut oil | 0 | 25 |
| Vulcanizing activators | 7 | 7 |
| Hydrocarbon resin | 5 | 5 |
| Antioxidant | 1.25 | 1.25 |
| Final Batch | | |
| Sulfur | 1.61 | 1.61 |
| Accelerators | 9.57 | 9.57 |
| Activator | 1.5 | 1.5 |

[1]extended with 37.5 phr of low PCA oil
[2]N110 grade

TABLE 2

Mixing Parameters

| Stage | Time | Condition |
|---|---|---|
| Master-Batch Stage (initial temp: 71° C. (160° F.), rotor rpm started at 30) | 0 seconds | Charge polymers |
| | 30 seconds | Charge any oil, filler (e.g., any carbon black and/or silica) and other master-batch ingredients, increase rotor to 40 rpm |
| | | Drop based on max temperature of 290° F. (143° C.) |
| Final Batch Stage (initial temp: 82° C. (180° F.), rotor rpm at 40) | 0 seconds | Charge Master-batch. |
| | 0 seconds | Charge curatives (i.e., sulfur and accelerators). |
| | | Drop based on max temperature of 210° F. (98° C.) |

Tensile mechanical properties of the samples were determined following the guidelines of, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). The specimens were tested at 23° C. Samples had been cured for 20 minutes at 155° C. After curing, samples for room temperature testing were conditioned by allowing them to sit in the lab for at least 24 hours at room temperature before performing room temperature testing. Samples for 100° C. testing were conditioned or heat soaked at 100° C. prior to testing. The abbreviation Eb is used for elongation at break, which measurement provides an indication of a rubber component's tear resistance, which is particularly relevant when it is incorporated into a tire tread. The abbreviation M100 is used for tensile stress measured (in psi or MPa) at 100%. The abbreviation E' is used for dynamic storage modulus, which provides a measure of the stiffness or hardness of the rubber composition. When the rubber composition is incorporated into a tire tread, the E' at 35° C. provides an indication of the composition's fundamental stiffness at room temperature, and the E' at 100° C. provides an indication of the composition's fundamental stiffness at the high end of operating temperatures.

Durometer values were measured in accordance with ASTM D2440. When the rubber composition is incorporated into a tire tread, the room temperature durometer value provides an indication of tread hardness in the initial phase of tire use (e.g., before any heat is generated from friction or loading), and the 100° C. durometer value provides an indication of hardness at or near operating temperatures experienced during racing conditions.

Tan δ values were measured using a spectrometer manufactured by Ueshima Seisakusho Co., Ltd (a dynamic viscoelasticity measuring device). Test conditions were −50 to 15° C. at 0.1% strain, and 15 to 100° C. at 4% strain and 52 Hz. The testing was performed following the guidelines of, but not restricted to, the standard procedure described in ASTM D5992. A rubber composition's tan δ at 0° C. is indicative of its low temperature viscoelastic properties when incorporated into a tire tread and its tan δ at 100° C. is indicative of its high temperature viscoelastic properties when incorporated into a tire tread.

Measured values are reported in Table 3 with the indexed values being included to illustrate that the replacement of 25 phr of low PCA oil in control Example 1 with 25 phr of coconut oil in Example 2 results in comparable values for tan δ at 100° C., Eb at 23° C., E' at 35° C., E' at 100° C., M100 at 23° C., durometer at 23° C., and durometer at 100° C., with each value other than tan δ at 35° being within 90% of the control value. Each indexed value was calculated by first dividing the measured value by the respective value for the control Example 1 and multiplying the result by 100.

TABLE 3

| Measurement | Ex. 1 | Ex. 2 |
|---|---|---|
| Tan δ (35° C.) | 0.297 | 0.257 |
| Indexed tan δ (35° C.) | 100 | 87 |
| Tan δ (100° C.) | 0.150 | 0.135 |
| Indexed Tan δ (100° C.) | 100 | 90 |
| Eb (23° C.) | 150 | 136 |
| Indexed Eb (23° C.) | 10 | 91 |
| E' (35° C.) | 6.25 | 5.62 |
| Indexed E' (35° C.) | 100 | 90 |
| E' (100° C.) | 4.90 | 4.68 |
| Indexed E' (100° C.) | 100 | 96 |
| M100 (23° C.) in psi | 551 | 541 |
| Indexed M100 (23° C.) in psi | 100 | 98 |
| M100 (23° C.) in MPa | 3.80 | 3.73 |
| Indexed M100 (23° C.) in MPa | 100 | 98 |
| Durometer (23° C.) | 66.2 | 66.1 |
| Indexed Durometer (23° C.) | 100 | 100 |
| Durometer (100° C.) | 62.5 | 62.4 |
| Indexed Durometer (100° C.) | 100 | 100 |

1-extended with 37.5 phr of low PCA oil
2-N110 grade

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A race tire tread comprising a rubber composition comprising:
    100 parts by weight of at least one elastomer selected from the group consisting of natural rubber, synthetic polyisoprene rubber, polybutadiene rubber, styrene-butadiene rubber, and combinations thereof;
    about 65 to about 150 phr of reinforcing filler comprising carbon black, or carbon black and silica, wherein about 95 to 100% by weight of the reinforcing filler is one or more carbon blacks;
    about 5 to about 70 phr of at least one hydrocarbon resin;
    about 25 to about 100 phr of at least one plant oil comprising a palm oil and optionally at least one additional oil;
    wherein the total amount of reinforcing filler is at least about 25% by weight of the rubber composition, and the total amount of oil in the rubber composition is at least 60 phr and comprises about 15 to about 35% by weight of the rubber composition,
    wherein the road-contacting surface of the tread is slick.

2. The race tire tread of claim 1, wherein a majority by weight of the 100 parts by weight of at least one elastomer comprises a synthetic elastomer, optionally oil-extended.

3. The race tire tread of claim 2, wherein the synthetic elastomer comprises styrene-butadiene copolymer, optionally functionalized.

4. The race tire tread of claim 1, wherein 100% by weight of the 100 parts by weight of at least one elastomer comprises styrene-butadiene copolymer.

5. The race tire tread of claim 1, wherein the at least one elastomer comprises a majority by weight of at least one oil-extended synthetic elastomer and the at least one oil-extended synthetic elastomer comprises 25-60% by weight oil.

6. The race tire tread of claim 1, wherein the palm oil is present in an amount of 40 to 90 phr.

7. The race tire tread of claim 6, wherein the palm oil comprises coconut oil.

8. The race tire tread of claim 1, wherein the rubber composition meets at least one of the following:
    a. has a durometer reading of about 20 to about 65 at 100° C.;
    b. has a durometer reading at room temperature of about 40 to about 70;
    c. has an elongation at break of about 400 to about 900% at room temperature;
    d. has a tan δ at 35° C. of about 0.2 to about 0.8;
    e. has a tan δ at 100° C. of about 0.1 to about 0.6;
    f. has an E' at 35° C. of about 2.5 to about 10; or
    g. has an E' at 100° C. of about 1.1 to about 6.

9. The race tire tread of claim 1 wherein the at least one elastomer is functionalized, oil-extended styrene-butadiene copolymer.

10. A race tire having a tread comprising a rubber composition comprising:
    100 parts by weight of at least one elastomer selected from the group consisting of natural rubber, synthetic polyisoprene rubber, polybutadiene rubber, styrene-butadiene rubber, and combinations thereof;
    about 65 to about 150 phr of reinforcing filler comprising carbon black, or carbon black and silica, wherein about 95 to 100% by weight of the reinforcing filler is one or more carbon blacks;
    about 5 to about 70 phr of at least one hydrocarbon resin;
    about 25 to about 100 phr of at least one plant oil comprising a palm oil and optionally at least one additional oil;
    wherein the total amount of reinforcing filler is at least about 25% by weight of the rubber composition, and the total amount of oil in the rubber composition is at least 60 phr and comprises about 15 to about 35% by weight of the rubber composition,
    wherein the road-contacting surface of the tread is slick.

11. The race tire of claim 10, wherein the at least one elastomer is styrene-butadiene copolymer.

12. The race tire of claim 10, wherein the at least one elastomer is functionalized styrene-butadiene copolymer.

13. A race tire having a tread comprising a rubber composition comprising:
    100 parts by weight of at least one elastomer selected from the group consisting of natural rubber, synthetic polyisoprene rubber, polybutadiene rubber, styrene-butadiene rubber, and combinations thereof;
    about 65 to about 150 phr of reinforcing filler comprising carbon black, or carbon black and silica, wherein about 95 to 100% by weight of the reinforcing filler is one or more carbon blacks;
    about 5 to about 70 phr of at least one hydrocarbon resin;
    about 25 to about 100 phr of coconut oil and optionally at least one additional oil;
    wherein the total amount of reinforcing filler is at least about 25% by weight of the rubber composition, and the total amount of oil in the rubber composition is at least 60 phr and comprises about 15 to about 35% by weight of the rubber composition,
    wherein the road-contacting surface of the tread is slick.

14. The race tire of claim 13, wherein the rubber composition meets at least one of the following:
    a. has a durometer reading of about 20 to about 65 at 100° C.;
    b. has a durometer reading at room temperature of about 40 to about 70;

c. has an elongation at break of about 400 to about 900% at room temperature;
d. has a tan δ at 35° C. of about 0.2 to about 0.8;
e. has a tan δ at 100° C. of about 0.1 to about 0.6;
f. has an E' at 35° C. of about 2.5 to about 10; or
g. has an E' at 100° C. of about 1.1 to about 6.

15. The race tire of claim 14, wherein the at least one elastomer comprises a majority by weight of at least one oil-extended synthetic elastomer and the at least one oil-extended synthetic elastomer comprises 25-60% by weight oil.

16. The race tire of claim 13, wherein the rubber composition meets all of the following:
   a. has a durometer reading of about 20 to about 65 at 100° C.;
   b. has a durometer reading at room temperature of about 40 to about 70;
   c. has an elongation at break of about 400 to about 900% at room temperature;
   d. has a tan δ at 35° C. of about 0.2 to about 0.8;
   e. has a tan δ at 100° C. of about 0.1 to about 0.6;
   f. has an E' at 35° C. of about 2.5 to about 10; or
   g. has an E' at 100° C. of about 1.1 to about 6.

17. The race tire of claim 16, wherein the coconut oil is present in an amount of 40 to 90 phr.

18. The race tire of claim 17, wherein a majority by weight of the 100 parts by weight of at least one elastomer comprises an oil-extended synthetic elastomer.

19. The race tire of claim 18, wherein the synthetic elastomer comprises a functionalized styrene-butadiene copolymer.

20. The race tire of claim 16, wherein 100% by weight of the 100 parts by weight of at least one elastomer comprises styrene-butadiene copolymer.

* * * * *